United States Patent [19]

Iriguchi et al.

[11] Patent Number: 5,543,456
[45] Date of Patent: Aug. 6, 1996

[54] PROCESS FOR PREPARING AN AQUEOUS RESIN DISPERSION AND AN AQUEOUS RESIN DISPERSION OBTAINED BY THE PROCESS

[75] Inventors: Jiro Iriguchi, Kakogawa; Tomoyuki Kuwamoto; Junichi Chosa, both of Takatsuki; Tatsuhito Matsuda, Kobe, all of Japan

[73] Assignee: Nippon Shokubai Co., Ltd., Osaka, Japan

[21] Appl. No.: 311,341

[22] Filed: Sep. 23, 1994

[30] Foreign Application Priority Data

| Sep. 27, 1993 | [JP] | Japan | 5-240085 |
| Nov. 8, 1993 | [JP] | Japan | 5-278222 |
| Nov. 29, 1993 | [JP] | Japan | 5-297860 |
| Apr. 14, 1994 | [JP] | Japan | 6-076010 |
| May 10, 1994 | [JP] | Japan | 6-096586 |
| May 31, 1994 | [JP] | Japan | 6-118226 |
| Jun. 23, 1994 | [JP] | Japan | 6-141593 |
| Jul. 25, 1994 | [JP] | Japan | 6-172248 |

[51] Int. Cl.$^6$ .................................................. C08L 61/02
[52] U.S. Cl. ......................................... 524/542; 524/818
[58] Field of Search .................................... 524/542, 818

[56] References Cited

U.S. PATENT DOCUMENTS

| 3,819,555 | 6/1974 | Kaufman | 260/29.4 |
| 4,016,127 | 4/1977 | Larsson et al. | 260/29.6 |
| 4,988,762 | 1/1991 | Overbeek et al. | 524/839 |
| 5,075,360 | 12/1991 | Fitt et al. | 524/48 |
| 5,290,894 | 3/1994 | Melrose et al. | 526/315 |

FOREIGN PATENT DOCUMENTS

| 0304788A2 | 3/1989 | European Pat. Off. . |
| 304788 | 3/1989 | European Pat. Off. . |
| 71018484 | 6/1966 | Japan . |
| 51-30576 | 9/1976 | Japan . |
| 61-171707 | 8/1986 | Japan . |
| 5-01270 | 1/1993 | Japan . |

OTHER PUBLICATIONS

Encyclopedia of Chemical Technology, vol. 1, (1978), "Acrolein and Derivatives", pp. 277–297.
Kobunshi Kagaku, vol. 28, No. 313, May 1971, pp. 430–436, "Acrolein Polymer".
Chemical Abstracts, vol. 107, No. 24, Dec. 14, 1987, Abe et al., "Self–Crosslinking Resin Compositions".
Chemical Abstracts, vol. 108, No. 4, Jan. 25, 1988, Abe et al., "Self–Crossing Copolymer Compositions".
Chemical Abstracts, vol. 115, No. 16, Oct. 21, 1991, H. Yoshikawa, "Storage–Stable Water–Based Resin Compositions giving Water–and Oil–Resistant Coating Films".

Primary Examiner—Jeffrey T. Smith
Attorney, Agent, or Firm—Ronald J. Kubovcik

[57] ABSTRACT

A process for preparing an aqueous resin dispersion includes the steps of copolymerizing a polymeric monomer whose ratio of (meth) acrolein to a total amount of the (meth) acrolein and a vinyl monomer is in the range from 10 weight % to 80 weight % in an organic solvent to obtain a copolymer solution, dispersing the obtained copolymer solution in an aqueous medium and removing an unreacted (meth) acrolein. Since the above process can extremely reduce contents of the unreacted (meth) acrolein and of an oligomer whose number-average molecular weight is less than 1000, an aqueous resin dispersion where problems of a pungent smell, toxicological properties, etc. due to the (meth) acrolein and the oligomer are eliminated can be provided.

11 Claims, 2 Drawing Sheets

PROCESS FOR PREPARING AN AQUEOUS RESIN DISPERSION AND AN AQUEOUS RESIN DISPERSION OBTAINED BY THE PROCESS

FIELD OF THE INVENTION

The present invention relates to a process for preparing an aqueous resin dispersion in which a copolymer composed of (meth) acrolein and a vinyl monomer other than (meth) acrolein is dispersed in an aqueous medium, and an aqueous resin dispersion obtained by the process.

BACKGROUND OF THE INVENTION

It is known that a stable aqueous resin dispersion can be obtained by carrying out normal emulsion polymerization using a vinyl monomer containing (meth) acrolein, and processes which are disclosed in U.S. Pat. No. 4,988,762, Kobunshi Kagaku 1971, Vol. 28, No. 313 PP. 430 through 436, etc. are known. In the emulsion polymerization, since polymer conversion of the (meth) acrolein is not 100%, after a polymerization reaction is completed, it is necessary to distill off unreacted (meth) acrolein from an aqueous resin dispersion. However, with the conventional emulsion polymerization method, it is hard to distill off the unreacted (meth) acrolein from the aqueous resin dispersion. Therefore, aqueous resin dispersion obtained by the conventional emulsion polymerization method has a problem of a pungent smell and toxicological properties which are peculiar to (meth) acrolein.

Further, in the case where a copolymer containing a lot of (meth) acrolein is prepared by the conventional emulsion polymerization method, a lot of oligomers whose number-average molecular weight (Mn) is below 1000 originated in a homopolymer of (meth) acrolein is produced. These oligomers have toxicological properties, so the aqueous resin dispersion has toxicological properties originated in the oligomer.

For this reason, the aqueous resin dispersion obtained by the conventional emulsion polymerization method has a problem of a difficulty in practical use.

On the other hand, a polyvinyl alcohol is peculiar synthetic resin which dissolves in water, and has a strong adhesive force and emulsification force, and forms a strong film. For these reasons, the polyvinyl alcohol is widely applied to various uses. The applications are, for example, vinylon fiber, film, adhesive, fabric size, fabric processing agent, paper agent, emulsification dispersant, etc. Moreover, emulsified material in which the polyvinyl alcohol is used as protective colloid, especially, polyvinyl acetate resin emulsion is used as coating material, adhesive, mortar binder, etc.

Further, since starch is a kind of a polysaccharide and has a strong adhesive force and forms a strong film. For these reasons, starch is widely applied to various uses. The applications are, for example, yarn-making size, fabric processing agent, filler, adhesive, etc.

However, since a polyvinyl alcohol group and starch are water-soluble, moldings containing mainly the polyvinyl alcohol and starch, and products using partly the polyvinyl alcohol and starch are inferior in water resistance, hot water-resistance, etc. In the cases especially where polyvinyl acetate resin emulsion is used as painting material, adhesive, mortar binder for moldings, etc., and where starch is used as filler for a wood material fibreboard and mineral material fibreboard, since these products are mostly used in the fields of public civil engineering and construction industry which are done outdoors, the problem of the water resistance becomes serious. Therefore, a water-resistant improver which is capable of improving water resistance and hot water resistance of products and compositions containing a polyvinyl alcohol and starch is desired as a kind of a water-resistant improver.

Here, in order to improve water-resistance and hot water resistance, etc. of products and compositions a containing polyvinyl alcohol and starch, various water-resistant improvers have been examined. However, for example, in the case where low-molecular aldehyde compound such as glyoxal is used as a water-resistant improver, a pot life is short and enough hot water-resistance is not provided. Moreover, in the case where urea resin, melamine resin, phenol resin, etc. are used as a water-resistant improver, there arises problems that heating treatment at 100° C. and above is required and free formalin, etc. is generated. Further, a water-resistance improving method by using aqueous vinyl urethane obtained by dispersing isocyanate compound in water with hydrophobic organic solvent (Japanese Examined Patent Publication No. 30576/1976 (Tokukosho 51-30576)) is reported. However, in this case, problems that a pot life is extremely short in the use under condition of more than 30° C. are left and toxicological properties are high. Moreover, a process for adding metallic salt such as aluminum chloride, aluminum nitrate, chrome nitrate, zinc chloride, zirconium nitrate, as a water-resistant improver is proposed. However, in the case where products and compositions where the water-resistant improver is used is disposed, since metal component originated in the metallic salt flows out, such products and compositions have an disadvantage which causes environmental pollution. As mentioned above, the conventional water-resistant improver is not practical because of its various problems.

In addition, a paper strength additive which reinforces wet strength of paper is known as a kind of a water-resistant improver. Polyamide-polyamine-epichlorohydrin resin is widely used as the paper strength additive. However, the conventional paper strength additive can provide strong wet strength, but its strong wet strength deteriorates breakability of paper. For this reason, when the conventional paper strength additive is used, there arises a problem that broken paper is difficult to be recovered (recycle of paper). Here, a paper strength additive which provides excellent breakability is also known, but this paper strength additive has weaker wet strength than the polyamide-polyamine-epichlorohydrin resin. Therefore, a paper strength additive, which can simultaneously provide wet strength equivalent to the polyamide-polyamine-epichlorohydrin resin and excellent breakability, is desired.

In addition, it is known that a (meth) acrolein monomer shows antifungal properties, and it is disclosed in, for example, Kirk-Othmer. "Encyclopedia of Chemical Technology" (3rd. ED.), Vol. 1, Wiley-Interscience (New York), etc. Moreover, a (meth) acrolein copolymer is disclosed as an anti-fungus agent in U.S. Pat. No. 5,290,894. However, the above publication does not disclose any process for a (meth) acrolein copolymer which is used as an aqueous resin dispersion, and any problems of a pungent smell, toxicological properties, etc. due to unreacted (meth) acrolein in the aqueous resin dispersion, an oligomer, etc. to be by-produced. Furthermore, in order to provide effective antifungal properties to various products and compositions, it is necessary to increase a content of (meth) acrolein unit in a copolymer. Therefore, an anti-fungus agent which can provide effective antifungal properties to various products and compositions is desired.

SUMMARY OF THE INVENTION

It is a first object of the present invention to provide a process for preparing an aqueous resin dispersion where problems of a pungent smell, toxicological properties, etc. are eliminated.

In order to achieve the first object, a process for preparing an aqueous resin dispersion of the present invention is characterized by comprising the steps of:

Copolymerizing a polymeric monomer whose ratio of (meth) acrolein to a total amount of (meth) acrolein and a vinyl monomer is in the range from 10 weight % to 80 weight % in an organic solvent to obtain a copolymer solution;

dispersing the obtained copolymer solution in an aqueous medium; and removing an unreacted (meth) acrolein.

Since the above process can extremely reduce contents of the unreacted (meth) acrolein and of an oligomer whose number-average molecular weight is less than 1000, an aqueous resin dispersion where problems of a pungent smell, toxicological properties, etc. due to the (meth) acrolein and the oligomer are eliminated can be prepared. Furthermore, since the above process makes it easy to adjust (control) an average particle diameter of the copolymer and the average particle diameter can be reduced to from 0.01 μm to 0.2 μm, for example, an aqueous resin dispersion whose can-stability is excellent can be prepared. Since it is possible to prepare an aqueous resin dispersion whose content of (meth) acrolein unit in the copolymer is uniform and to produce an aqueous resin dispersion of a high quality stably and efficiently, etc., from an industrial point of view, the above process is extremely useful.

It is a second object of the present invention to provide an aqueous resin dispersion where problems of a pungent smell, toxicological properties, etc. are eliminated by extremely reducing the content of the unreacted (meth) acrolein and the oligomer whose number-average molecular weight is less than 1000.

In order to achieve the second object, the aqueous resin dispersion of the present invention is characterized by being obtained by the processes including the step of copolymerizing a polymeric monomer whose ratio of (meth) acrolein to a total amount of (meth) acrolein and a vinyl monomer is in the range from 10 weight % to 80 weight % in an organic solvent to obtain a copolymer solution, the step of dispersing the obtained copolymer solution in an aqueous medium and the step of removing an unreacted (meth) acrolein. Moreover, the aqueous resin dispersion is characterized by that the content of the residual (meth) acrolein is 0.1 weight % or below to a solid content of the aqueous resin dispersion. Further, the aqueous resin dispersion is characterized by that the content of the oligomer whose number-average molecular weight is below 1000 is 10 weight % or below to a solid content of the aqueous resin dispersion.

With the above composition, since contents of the unreacted (meth) acrolein and the oligomer whose number-average molecular weight is less than 1000 are extremely little, the problems of a pungent smell, toxicological properties, etc. due to the (meth) acrolein and the oligomer can be eliminated. Moreover, with the above composition, since the average particle diameter of the copolymer can be reduced to from 0.01 μm to 0.2 μm, can-stability and also compatibility with another aqueous medium are excellent. Therefore, the aqueous resin dispersion having the above composition can be applied to all applications which use aldehyde groups in copolymers. For example, the aqueous resin dispersion is applicable to a water-resistant improver, a paper strength additive, an anti-fungus agent, etc.

The following will discuss the present invention in detail.

(Meth) acrolein which is used in the present invention is acrolein and/or methacrolein. In the present invention, at least one of both or mixture of both can be used, but in consideration of industrial supplies, acrolein is suitable.

A vinyl monomer, which is copolymerized with (meth) acrolein, of the present invention is not particularly limited. Examples of the vinyl monomer include: (meth) acrylic acid and its ester groups; (meth) acrylamide and its derivatives; styrene and its derivatives; (meth) acrylonitrile; vinyl halide such as vinylidene chloride, vinyl chloride; a vinyl ester groups such as vinyl acetate; maleic acid and its ester groups; heterocyclic vinyl compounds; aliphatic vinyl compounds such as butadiene, isoprene, etc. Such vinyl monomers may be individually used according to applications. Furthermore, two and over kinds of vinyl monomers may be suitably mixed. In such vinyl monomers, methacrylic acid and its ester cernatives, styrene and its derivatives, and mixture of these are especially preferable because they have excellent reactivity with acrolein radical.

Preferably, a ratio of (meth) acrolein to a total weight of (meth) acrolein and vinyl monomers (hereinafter, they are referred to as a polymeric monomer), namely, a content of the (meth) acrolein in the polymeric monomer is in the range from 10 weight % to 80 weight %. In other words, it is preferable that the content of the (meth) acrolein unit in the copolymer obtained by copolymerizing the polymeric monomer is in the range from 10 weight % to 80 weight %. Therefore, the content of the vinyl monomer in the copolymer is in the range from 20 weight % to 90 weight %.

It is not preferable when the content of the (meth) acrolein is less than 10 weight %, because an aqueous resin dispersion to be obtained does not have desired properties (for example, water resistance function, paper strength function, antifungal properties). In the case where the content of the (meth) acrolein exceeds 80 weight %, when polymeric monomers are polymerized in an organic solvent, an insoluble polymer is separated out in the organic solvent. For this reason, this is not preferable because a copolymer to be obtained cannot be uniformly dispersed in aqueous medium.

As the content of the (meth) acrolein in the polymeric monomer increases, properties of the aqueous resin dispersion to be obtained become more superior. For this reason, it is preferable that the content is 20 weight % and over, and more preferable, 30 weight % and over. Meanwhile, the polymerization in the organic solvent can be carried out more stably as the content of the (meth) acrolein in the polymeric monomer is less. For this reason, it is more preferable that the content is 60 weight % or below, and particularly preferable 50 weight % or below. Therefore, it is more preferable that the content of the (meth) acrolein in the polymeric monomer is in the range from 20 weight % to 60 weight %, and most preferably in the range from 30 weight % to 50 weight %. Here, the content of the (meth) acrolein can be obtained by a measurement of unreacted (meth) acrolein using a gas chromatograph according to the internal standard method.

A molecular weight of a copolymer obtained by copolymerizing a polymeric monomer is not particularly limited, but it is usually preferable that a number-average molecular weight (Mn) is in the range from 3000 to 500000 and more preferably in the range from 4000 to 100000. The molecular weight can be suitably adjusted according to, for example, an usage of polymerization initiator, concentration of a polymeric monomer in an organic solvent, as to whether or not a chain transfer agent is used, etc. Here, in the present invention, a number-average molecular weight represents a number-average molecular weight in polystyrene conversion which is measured by gel permeation chromatography.

A polymerization method at the time of copolymerizing a polymeric monomer is not particularly limited, so, for example, polymerization methods such as radical polymerization, redox polymerization, ion polymerization can be suitably used. A polymerization initiator which is used for the polymerization reactions is not particularly limited, so it is suitably selected according to the polymerization methods. For example, in the case of radical polymerization, fat-soluble radical initiators, such as an azo initiator and an organic peroxide are suitable. Concretely, examples of the azo initiator include azobis(isobutyronitrile), azobis(dimethylvaleronitrile), azobis(cyclopropylpropionitrile), azobis-(methoxy-dimethylvaleronitrile), azobis (cyclohexane carbonitrile), azobis(methyl-propionitrile), etc. In addition, examples of the organic peroxide include; ketone peroxide such as methyl ethyl ketone peroxide; diacyl peroxide such as lauroyl peroxide, benzoyl peroxide; hydroperoxide such as cumene hydroperoxide, t-butyl hydroperoxide; dialkyl peroxide such as dicumyl peroxide, di-tert-butyl peroxide; peroxy ketal; alkyl perester; percarbonate, etc. Such polymerization initiators may be individually used, and also two and over kinds of initiators may be suitably mixed according to applications. Further, the usage of such polymerization initiators is not particularly limited, but it is preferable that the usage is in the range from 0.1 weight % to 5 weight % relative to the polymeric monomer.

Here, the (meth) acrolein usually contains water as impurity. For this reason, it is economically hard to change completely from polymerization system to non-aqueous system. Therefore, ion polymerization which requires change from the polymerization system to the non-aqueous system is unsuitable from this point of view.

A reaction temperature of the polymerization reaction is not particularly limited, but it is preferable that it is in the range from 30° C. to 100° C. and more preferably in the range from 50° C. to 80° C. The case where the reaction temperature is lower than 30°0 C. is not preferable because polymerization speed is slow. Moreover, the case where the reaction temperature is higher than 100° C. is not economically preferable because a reaction container to which a pressure can be applied is occasionally required. A reaction time of the polymerization reaction depends upon a polymerization method, etc, but it is suitable that the reaction time is in the range from 2 hours to 10 hours.

The organic solvent which is used at the time of the polymerization reaction is not particularly limited. Examples of the organic solvent include: an aliphatic hydrocarbon such as hexane, heptane, octane; an aromatic hydrocarbon such as benzene, toluene, xylene; an ester such as methyl acetate, ethyl acetate, butyl acetate; an ether such as dimethoxyethane, diethoxyethane, ethoxymethoxyethane, dioxane, tetrahydrofuran: an aliphatic or aromatic ketone such as methyl ethyl ketone, methyl butyl ketone, benzophenone, etc. Such organic solvents may be used individually, and also two and over kinds of organic solvents may be mixed. In such organic solvents, an organic solvent, which is not substantially dissolved in water, is economically preferable because the copolymer solution containing copolymer (namely, organic solvent) can be recovered and recycled after being dispersed in an aqueous medium. Moreover, the copolymer solvent is preferable because its stability becomes firmer as a polarity of the organic solvent is higher. Therefore, from these conditions, in the above-mentioned organic solvents, the ester and toluene are preferable and the ester acetate is more preferable.

The usage of the organic solvent is not particularly limited, but it is suitable that the usage is in the range from 0.1 weight ratio to 10 weight ratio to a polymeric monomer. If the usage of the organic solvent is less than 0.1 weight ratio, a viscosity of the copolymer solution at the time of the completion of the polymerization becomes high. For this reason, this is not preferable because a special device is required. Further, even if the usage of the organic solvent is increased more than 10 weight ratio, only an economical burden is increased.

As the aqueous medium which is used for dispersion of the copolymer solution, water or mixture of water and organic solvent which is dissolved in water is suitable.

When the copolymer solution is dispersed in the aqueous medium, it is preferable that concentration of the copolymer in the copolymer solution is preliminarily adjusted to the range from 10 weight % to 70 weight %, and more preferable to the range from 20 weight % to 60 weight %. If the concentration of the copolymer is higher than 70 weight %, the viscosity of the copolymer solution becomes too high. As a result, it is difficult to disperse the copolymer solution uniformly, so this is not preferable. Moreover, even if the concentration of the copolymer is decreased to less than 10 weight %, its result is not changed and only an economic burden is increased. Further, an organic solvent which is used for adjusting concentration of a copolymer solution may be identical to one which is used for a polymerization reaction and may be also different. However, if the identical organic solvent is used, since a process for separating them from each other is unnecessary when the organic solvent is recycled, it has an economic advantage.

In addition, as to a relationship between a copolymer solution to an aqueous medium, it is preferable that the ratio of the copolymer solution to a total weight of both is in the range from 30 weight % to 60 weight % and more preferable in the range from 35 weight % to 55 weight %. If the ratio of the copolymer solution is higher than 60 weight %, a phase transition easily occurs. As a result, the dispersion is difficult. Further, even if the ratio of the copolymer solution is decreased to less than 30 weight %, the result is not changed but only an economic burden is increased.

When a copolymer solution is dispersed in an aqueous medium, a dispersing device such as an agitator, a homogenizer, a high-pressure homogenizer, which are commonly used can be used, but it depends upon an average particle diameter of a desired copolymer. For example, if a desired average particle diameter is in millimeters, an agitator which is commonly used is preferable. Moreover, if the desired average particle diameter is in μ-millimeters, a homogenizer is preferable. Further, if the desired average particle diameter is in the range from 0.01 μm to 1 μm, it is preferable that after being roughly dispersed by a homogenizer, the copolymer solution is dispersed more finely by a high-pressure homogenizer. Here, a number of revolutions of an agitator and differential pressures of a homogenizer and a high-pressure homogenizer can be suitably selected according to a desired average particle diameter.

When a copolymer solution is dispersed in an aqueous medium, a general surface-active agent which is used for emulsion polymerization can be used. Examples of the surface-active agent include an anionic surface-active agent such as alkyl sulfuric ester salt, alkylbenzene sulfonate, alkylnaphthalene sulfonate, alkyl phosphate, alkyldiphenyl ether disulfonate, polyoxyethylene alkyl aryl sulfuric ester salt, alkyl aryl sulfuric ester salt; a nonionic surface-active agent such as polyvinyl alcohol (Poval), polyoxyethylene alkyl aryl ether, alkyl aryl ether, polyoxyethylene derivative, glycerin fatty ester, higher aliphatic alcohol; a cationic surface-active agent such as amine oxide, alkyl amine salt, alkyl betaine, and quaternary ammonium salt. Moreover, in the case where the surface-active agent is sulfate, a compound of sodium sulfate is preferable because an aqueous resin dispersion is not coloured. In the case where the average particle diameter of the copolymer is 0.1 µm and below, an anionic surface-active agent or a surface-active agent which is a compound of an anionic surface-active agent and a nonionic surface-active agent is preferable. Further, in these surface-active agents, polyoxyethylene alkyl aryl sulfuric ester salt, alkyl aryl sulfuric ester salt, alkyl sulfuric ester salt are more preferable. It is preferable that the usage of these surface-active agents to a copolymer is in the range from 0.1 weight % to 10 weight % in a solid content conversion, and more preferable in the range from 1 weight % to 7 weight %.

After the polymerization reaction, in order to remove an unreacted (meth) acrolein remaining in a reaction series, a copolymer solution or a dispersion obtained by dispersing the copolymer solution in an aqueous medium is heated under a normal pressure or a pressure which is reduced to 50 mmHg–600 mmHg, and vapor of the (meth) acrolein is simply separated. Here, it is economically preferable that the vapor is cooled so that the (meth) acrolein is recovered and recycled. Moreover, the organic solvent which has been used for the polymerization reaction is distilled off with the (meth) acrolein.

The removal process of the unreacted (meth) acrolein may be carried out before the copolymer solution is dispersed in the aqueous medium (namely, during a period from the point that the polymerization reaction is completed to the point that the dispersion process begins), and may be also carried out after the dispersion process. In some cases, the removal process can be carried out before and after the dispersion process. The removal of the remaining unreacted (meth) acrolein is easier and more efficient when the process is carried out before the dispersion process. Furthermore, this is preferable because an aqueous resin dispersion is not coloured. In this case, the copolymer solution is heated to 100° C. under a normal pressure or a pressure which is reduced to 50 mmHg–600 mmHg, and the (meth) acrolein may be distilled off with the organic solvent used for the polymerization reaction.

In the case where the residue of the (meth) acrolein is wanted to be further reduced, the following method can be adopted. Namely, a method for heating a temperature of the copolymer solution to 120° C. and over, a method for distilling off the (meth) acrolein with an organic solvent which is newly added, and a method which is a combination of these methods are suitable.

On the contrary, in the case where the removal process is carried out after the dispersion process, the dispersion is heated so as to have a temperature of 50° C.–100° C. under a normal pressure or a pressure which reduced to the range from 50 mmHg to 600 mmHg, and the (meth) acrolein may be distilled off with the organic solvent and the aqueous medium. In this case, concentration of a solid content in the aqueous resin dispersion can be adjusted by distilling off the aqueous medium with the organic solvent and the (meth) acrolein. Here, the solid content represents a content which is remained by removing volatile component such as the aqueous medium, the organic solvent, the unreacted polymeric monomer from the aqueous resin dispersion (for example, a copolymer, a surface-active agent, etc. which remain after 3-hour-drying at 110° C.).

The residue of the unreacted (meth) acrolein containing in the aqueous resin dispersion becomes 0.1 weight % and below to the solid content by carrying out the removal process. It is preferable that the residue of the (meth) acrolein is 0.1 weight % and below and more preferably 0.05 weight % and below, and most preferably 0.01 weight % and below. The case where the residue of the (meth) acrolein exceeds 0.1 weight % is not preferable because a pungent smell which is peculiar to (meth) acrolein becomes strong, and aqueous resin dispersion cannot be substantially used.

In addition, a content of an oligomer whose number-average molecular weight is less than 1000 containing in aqueous resin dispersion becomes 10 weight % and below to a solid content by copolymerizing the polymeric monomer by the polymerization method. It is more preferable that the content of the oligomer is less from a viewpoint of toxicological properties. In other words, it is preferable that the content of the oligomer is 10 weight % and below, and more preferably 5 weight % and below, and most preferably 2 weight %. Here, in the present invention, the content of the oligomer whose number-average molecular weight is less than 1000 represents an area ratio of a gel permeation chromatograph which is measured by a differential refractometer.

Since the above-mentioned aqueous resin dispersion contains a extremely small quantity of remaining unreacted (meth) acrolein and an oligomer whose number-average molecular weight is less than 1000, problems of a pungent smell, toxicological properties, etc. due to the (meth) acrolein and the oligomer can be eliminated. Further, as to the above-mentioned aqueous resin dispersion, an average particle diameter of a copolymer can be reduced to 0.01 µm–0.2 µm, its can-stability is excellent and also compatibility with another aqueous medium is excellent.

Therefore, the aqueous resin dispersion can be applied to all applications which utilize aldehyde groups in a copolymer. For example, the aqueous resin dispersion can be used as polymeric crosslinker utilizing a reaction between the aldehyde groups and functional groups which are capable of reacting with the aldehyde groups such as hydroxyl groups, amino groups, hydrazide groups, a thiol group, particularly, can be used as a water-resistant improver. In other words, the aqueous resin dispersion can be used as a synthetic polymeric crosslinker including hydroxyl groups and amino groups such as polyvinyl alcohol, vinyl alcohol-ethylene copolymer, polyvinyl acetate resin emulsion, acryl polyol, polyamine, polyethyleneimine; a polysaccharide group crosslinker such as starch, cellulose, carboxymethylcellulose; a protein crosslinker such as gelatin, casein, etc. Further, the aqueous resin dispersion is applicable to a fiber treatment; a durability additive such as a fiber treatment, dye; a paper strength additive; a germicide, an anti-fungus agent, etc. Here, in most cases, compound containing functional groups such as hydroxyl groups, amino groups, hydrazide groups, and a thiol group has water-solubility.

In addition, the aqueous resin dispersion can be used as a raw material of a water soluble polymer to which various metal chelate powers are given by reacting aldehyde groups in a copolymer with amino carboxylic acid, sodium sulfide, sodium hydrosulfide, etc.

In addition, with the above process for preparing the aqueous resin dispersion, since contents of remaining unreacted (meth) acrolein and an oligomer whose number-average molecular weight is less than 1000 can be extremely decreased, an aqueous resin dispersion in which troubles of a pungent smell, toxicological properties, etc. are eliminated can be provided. Further, with the above process for preparing the aqueous resin dispersion, since an average particle diameter of a copolymer can be easily adjusted (controlled), for example the average particle diameter can be reduced to 0.01 μm–0.2 μm, an aqueous resin dispersion whose can-stability is excellent can be prepared. The above process makes it possible to prepare an aqueous resin dispersion where a content of the (meth) acrolein unit in the copolymer is uniform. Industrially the above process is a very advantageous method such that an aqueous resin dispersion with a high quality can be stably and efficiently prepared.

Next, the following will discuss the case where the aqueous resin dispersion is used as a water-resistant improver.

In the case where the aqueous resin dispersion of the present invention is used as a water-resistant improver, the ester (meth) acrylate in the vinyl monomers which have been illustrated is preferable. Moreover, in the ester (meth) acrylate, such an ester having an alkyl group whose number of carbons is 3 and over as a propyl (meth) acrylate, and a butyl (meth) acrylate is more preferable. Further, it is preferable that the ester (meth) acrylate having the alkyl groups whose number of carbons is 3 and over accounts for from 10 weight % to 80 weight % of the copolymer. Water resistance of a water-resistant improver can be further improved by using the ester (meth) acrylate. Moreover, in the case where the water-resistant improver is used as a paper strength additive, the ester (meth) acrylate, and (meth) acrylamide and its derivative are preferable. The paper strength additive can be provided with retention of the additive in paper (pulp), so it is possible to further improve paper strength function.

The water-resistant improver can be applied to all products and compositions containing chemical or natural compounds containing a functional group capable of reacting with an aldehyde group in a copolymer. The water-resistant improver is suitable for especially all products and compositions containing a polyvinyl alcohol and starch, and all products using paper (pulp).

In addition, in the case where the aqueous resin dispersion of the present invention is used as a water-resistant improver, an acid catalyst can be used together. A crosslinking reaction of a polyvinyl alcohol, starch and pulp to a water-resistant improver can be promoted by using the acid catalyst together. This makes it possible to lower a reaction temperature and to shorten a reaction time.

Examples of the acid catalyst include: an organic acid group such as paratoluene sulfonic acid, methanesulfonic acid; an inorganic acid group such as hydrochloric acid, sulphuric acid, phosphoric acid; a metallic salt group such as nickel sulfate, zinc acetate, zirconium oxide, etc. These acid catalysts may be used separately, and also two and above kinds of these may be mixed according to applications. Further, the usage of these acid catalysts is not particularly limited, but it is preferable that its usage to a water-resistant improver is in the range from 1 weight % to 30 weight % in a solid content conversion.

First, the following will discuss the case where a water-resistant improver is applied to products and compositions containing a polyvinyl alcohol. Examples of the polyvinyl alcohol include: ethylene-polyvinyl alcohol copolymer, complete saponification polyvinyl alcohol, partial saponification polyvinyl alcohol; various denatured polyvinyl alcohol such as carboxy denatured polyvinyl alcohol, amino group denatured polyvinyl alcohol, etc. A composition, saponification degree, polymerization degree, etc. of the polyvinyl alcohol are not particularly limited.

In addition, products and compositions containing a polyvinyl alcohol are not particularly limited. Examples of the products and compositions include: one kind of the polyvinyl alcohol, mixtures of two kinds and over, emulsified products in which polyvinyl alcohol is used as protective colloid, and further, coatings, binder resin, moldings, etc. which are produced by using one kind of the polyvinyl alcohol and the mixtures and emulsified products.

In the case especially where the products and the compositions are emulsified products, water resistance function of the water-resistant improver is sufficiently displayed. Moreover, in the case of polyvinyl acetate resin emulsion in the emulsified products, the water resistance function is displayed most effectively. Examples of compositions of the polyvinyl acetate resin emulsion are not limited, but include: polymeric products of only polyvinyl acetate; copolymeric products of polyvinyl acetate and another vinyl monomer which can be copolymerized with the polyvinyl acetate (for example, ethylene, styrene, (meth) acrylic acid or its ester, etc.). particularly, water resistance, hot water resistance, etc. of coatings, binder resin, moldings, etc. produced by the emulsified products can be improved by using the emulsified products. Moreover, these emulsified products lower an eluation coefficient and a swelling coefficient at the time when the binder resin, moldings, etc. are soaked into water, for example, and also can prevent mechanical strength from being deteriorated.

The water-resistant improver can be mixed at a desired ratio to a polyvinyl alcohol, but it is preferable that admixture is in the range from 3 weight % to 80 weight % to a solid content of one kind of the polyvinyl alcohol, and more preferable in the range from 10 weight % to 70 weight %. Moreover, in the case of emulsified products in which polyvinyl alcohol is used as protective colloid, it is preferable that the admixture is in the range from 0.5 weight % to 20 weight % to a solid content of the emulsified products, and more preferably in the range from 2 weight % to 10 weight % in a solid content conversion.

The above-mentioned water-resistant improver can improve water resistance and hot water resistance, etc. of a polyvinyl alcohol by crosslinking-reacting aldehyde groups in the copolymer with functional groups in the polyvinyl alcohol. Furthermore, at the stage where the water-resistant improver is added to an aqueous liquid of the polyvinyl alcohol, or emulsified products in which the polyvinyl alcohol is used as protective colloid, a crosslinking reaction does not occur. For this reason, the aqueous liquid and the emulsified products are stable for a long time, and after they are dried, an effect of the water-resistant improver is first displayed. Therefore, the aqueous liquid and the emulsified products to which the water-resistant improver is added have excellent can-stability and workability. Here, it is satisfactory that a drying temperature at the time when an aqueous liquid and an emulsified product are dried is in the proximity of room temperature, but preferably is in the range from 50° C. to 200° C. The effect of the water-resistant improver is promoted by drying at this temperature, so the water resistance, hot water resistance, etc. are further improved.

The above-mentioned water-resistant improver lowers an eluation coefficient and swelling coefficient at the time when various products and compositions are soaked in water and also can prevent mechanical strength being deteriorated. For this reason, the water-resistant improver can be suitably applied to various applications where the polyvinyl alcohol is conventionally used. In the case especially where the products are used as an adhesive or a treatment for material containing hydroxyl groups such as paper, timber (a cellulose group), adhesion and service durability can be increased by adding the water-resistant improver of the present invention.

In addition, as to the above-mentioned water-resistant improver, since the copolymer contains aldehyde groups, functions such as antifungal properties, fungiproofing, etc. which arise from the aldehyde groups can be simultaneously given to various products and compositions. Moreover, since the water-resistant improver does not have toxicological properties and also does not contain a metal, environmental pollution is not caused by discharge of a metallic component.

Next, the following will discuss the case where a water-resistant improver is applied to products and compositions containing starch. The starch represents a simple starch substance, a molding that starch is used as filler, etc. Here, materials and a degree of processing, etc. of the starch are not particularly limited.

The molding represents a molded article associated with a composition containing starch and a water-resistant improver. The composition may contain at least starch and water-resistant improver as its components, so other components are not particularly limited. Furthermore, the molding is not particularly limited, but examples of the molding include a wood fibreboard that pulp formed by using starch as filler (binder), a mineral fibreboard that an inorganic material such as calcium carbonate is formed by using starch as filler, etc. Here, a molding method for the molding is not particularly limited, but the conventional molding method can be applied.

In the case especially where the products and the compositions are a wood fibreboard or a mineral fibreboard, the water-resistance function of the water-resistant improver is sufficiently displayed. In other words, when starch containing water-resistant improver is used as an adhesive and a treatment for paper, timber, etc., a crosslinking-reaction occurs between aldehyde groups in the copolymer and hydroxyl groups in cellulose. This increases adhesion and service durability of the starch.

The water-resistant improver can be mixed at a desired ratio to the starch, but it is preferable that admixture is in the range from 3 weight % to 100 weight % to a drying weight of a simple starch substance and more preferably, in the range from 10 weight % to 80 weight %. Furthermore, the mixing method of the water-resistant improver with starch is not particularly limited. Examples of the method include a method for mixing the water-resistant improver with a gelatinized starch aqueous solution, a method for just mixing the water-resistant improver with starch grains, etc. After the water-resistant improver is mixed with starch grains, the mixture is dried so that the starch grains which are denatured by the water-resistant improver can be obtained.

The above-mentioned water-resistant improver can improve water resistance and hot water resistance, etc. of starch by crosslinking-reacting aldehyde groups in the copolymer with hydroxyl groups in the starch. Here, it is satisfactory that a drying temperature at the time when the starch is dried is in the proximity of room temperature, but preferable in the range from 50° C. to 200° C. An effect of the water-resistant improver is improved by drying the starch at this temperature, so the water resistance, hot water resistance, etc. are further improved.

Here, at the stage where the water-resistant improver is added to a starch aqueous liquid, a reaction does not occur, so the mixture is stable for a long time. The effect is first displayed by drying the starch aqueous solution. Therefore, the water-resistant improver has excellent can-stability and workability.

A water absorption magnification at the time when products and compositions are soaked into water is lowered and the mechanical strength is improved at the same time by using the water-resistant improver. For this reason, the products and compositions can be suitably applied to various applications which are conventionally known.

Next, the following will discuss the case where a water-resistant improver is used applied to products using paper, namely, the case where the water-resistant improver is used as a paper strength additive for reinforcing wet strength of paper.

The paper strength additive can be mixed at a desired ratio to pulp, but it is preferable that the admixture is in the range from 0.05 weight % to 5 weight % to a drying weight of a simple pulp substance. Moreover, a method for mixing the paper strength additive with pulp is not particularly limited. Examples of this method include a method for dispersing pulp in water so as to add the paper strength additive, a method for incorporating the paper strength additive with the pulp by applying the paper strength additive to the pulp or by dipping the pulp into the paper strength additive, etc.

In addition, the paper strength additive can be used together with general additives for paper making, etc. such as aluminum sulfate, a general paper strength additive, a pigment, a sizing agent. Adsorption of the paper strength additive to the pulp can be further improved by using the paper strength additive especially together with a polyamine, a polyacrylamide, etc.

The paper strength additive can reinforce wet strength of paper by a crosslinking reaction between aldehyde groups in a copolymer and hydroxyl groups in pulp. Furthermore, since excellent breakability as well as the wet strength can be simultaneously given to paper by using the paper strength additive, it is easy to recover (recycle) broken paper.

As mentioned above, the aqueous resin dispersion can be used as a water-resistant improver which is capable of improving water resistance, hot-water resistance, etc. of various products and compositions. In other words, the aqueous resin dispersion can be used as a water-resistant improver capable of improving water resistance, hot-water resistance, etc. of products and compositions containing a polyvinyl alcohol group and starch or a paper strength additive capable of simultaneously giving wet strength and breakability.

Next, the following will discuss an anti-fungus agent using the aqueous resin dispersion.

The anti-fungus agent using the aqueous resin dispersion of the present invention has antifungal properties which arises from aldehyde groups in the copolymer, and is applicable to all kinds of products and compositions. In other words, products and compositions to which the anti-fungus agent can be applied are not particularly limited. Furthermore, the anti-fungus agent can be used for various products and compositions at a desired ratio.

Usage of the anti-fungus agent is not particularly limited, but the entirely same usage as of general antifungal substances composed of a low-molecular aldehyde compound such as formalin, glutaric aldehyde, etc. is applicable. Moreover, usage that the anti-fungus agent is incorporated with or applied to a substrate is also applicable. As the substrate, natural high polymers such as a cellulose, rayon, silk and gelatine; synthetic high polymers such as vinyl resin, acrylic resin, polyester, polyamide and polyurethane; ceramic, glass, concrete, timber, stone, metal, mineral, soil, etc. are suitable for materials. A permanent effect can be given to the substrate by means of reactivity of aldehyde groups in the copolymers. In other words, in the case where the above-mentioned materials contain functional groups such as hydroxyl groups, amino groups, hydrazide groups and thiol groups, etc. which are capable of reacting with the aldehyde groups, permanent antifungal properties can be given to the substrate by making the functional groups react with the aldehyde groups. Namely, the antifungal properties last for a long time.

In addition, the above-mentioned anti-fungus agent can be used such that it is mixed with other products and compositions according to applications. Examples of other products and compositions include coatings, adhesives, adhesive masses, etc.

The anti-fungus agent contains the copolymer as an active ingredient, so it has excellent antifungal properties and fungiproofness, etc. which arise from aldehyde groups in the copolymer. Furthermore, since the anti-fungus agent contains a very small quantity of unreacted (meth) acrolein and an oligomer, there is not problem of a pungent smell and toxicological properties due to the (meth) acrolein and the oligomer. In other words, the anti-fungus agent does not have problems of a pungent smell and toxicological properties, etc. which are peculiar to the (meth) acrolein with the antifungal properties and the fungiproofness, etc. which arise from the aldehyde groups being maintained. As a result, the anti-fungus agent is also suitably used as a sterilizer, germicide, mildewproofing agent, preservative, etc. As mentioned above, the aqueous resin dispersion can be used as an anti-fungus agent which is capable of giving effective antifungal properties to various products and compositions.

For a fuller understanding of the nature and advantages of the invention, reference should be made to the ensuing detailed description taken in conjunction with the accompanying drawings.

BRIEF DESCRIPTION OF THE EMBODIMENTS

Figure 1:
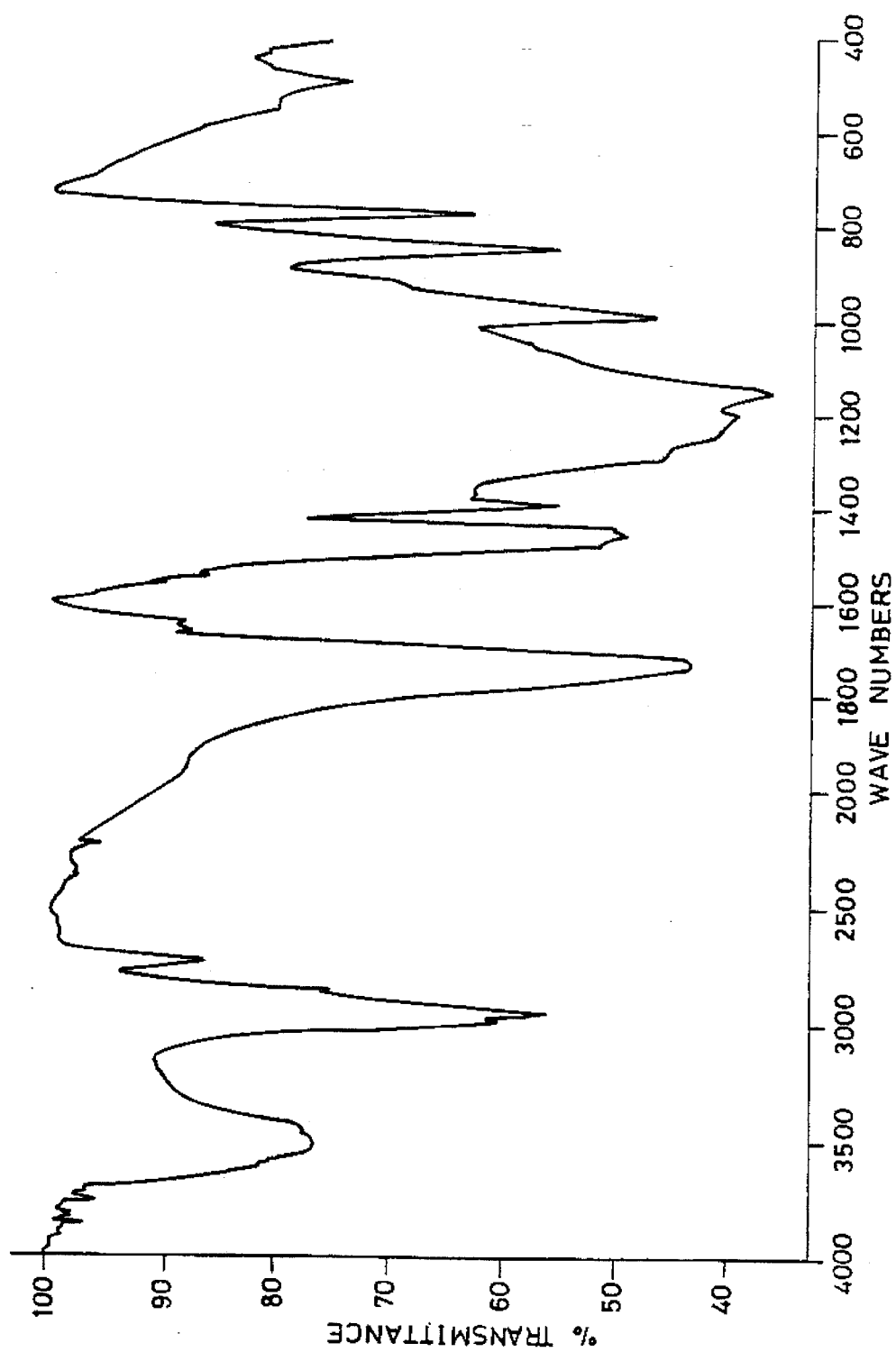
FIG. 1 shows an infrared absorption spectrum of a solid obtained in example 1.

The following examples and comparative examples will further discuss the present invention in detail, but the present invention is not limited to them. Here, various numerical values and physical properties described in the examples and the comparison examples were measured in manners presented below.
(a) Number-Average Molecular Weight (Mn)

A number-average molecular weight was measured by gel permeation chromatography (hereinafter, referred to as GPC). An HLC-8020-type device made by TOSOH was used as the measuring device. As to a column, HXL-L, G3000 and G2000 were connected and used. As to developing solvent, tetrahydrofuran was used. The number-average molecular weight was calculated based upon a calibration curve, which was made by using polystyrene as a standard sample whose molecular weight is known.
(b) Particle Diameter of Aqueous Resin Dispersion A particle diameter of aqueous resin dispersion was measured by using an NICOP-370-type submicron particle diameter measuring device made by Nozaki & Co., Ltd.

(c) Content of Unreacted (meth) acrolein and Vinyl Monomer

Unreacted (meth) acrolein and unreacted vinyl monomer were measured by gas chromatography (hereinafter, referred to as GC). A GC-14-type gas chromatograph device made by Shimadzu Corp. was used as a measuring device. As to a column, an SPB-1™ (capillary column, length:30 m, diameter:0.53 mm) made by SUPELCO was used.
(d) Infrared Absorption Spectrum (IR)

An FTS-45-type FT-IR device made by BIO RAD was used as a measuring device. As to an infrared absorption spectrum, a solid obtained by desolvating a reactive solution was measured by using a KBr method.

EXAMPLES

[Example 1]

A 1000 ml flask to which a reflux condenser and an agitator are installed was used as a reactor. After nitrogen was substituted in the reactor, 200 g of ethyl acetate as an organic solvent and 6.4 g of an azobis (dimethylvaleronitrile) (made by Wako Pure Chemical Industries, Ltd.; formation product V-65) as a polymerization initiator were prepared in the reactor. Next, a mixture of 72.0 g (1.29 mol) of acrolein and 128.5 g (1.29 mol) of methyl methacrylate (hereinafter, referred to as MMA) as a vinyl monomer was prepared and 20 percent of the mixture was put into the reactor.

Being agitated, the reactive solution was heated to 60° C. by oil bath, and thereafter, it was held at 60° C. for 30 minutes. Next, while the reactive solution was held at 60° C., 80 percent of the remained mixture was dropped into the reactor for two hours. After dropping, the reactive solution was held at 60° C. for 30 minutes, and was heated to 70° C. After the reactive solution was further held at 70° C. for two hours and was polyreacted, a copolymer reactive solution was obtained.

Unreacted acrolein and unreacted MMA in the copolymer reactive solution were determined by GC. Polymer conversions of the acrolein and the MMA calculated from these values were respectively 85% and 87%. An acrolein unit in the copolymer which was calculated from the polymer conversions accounted for 35 weight %.

Successively, after the reflux condenser in the reactor was replaced by a condensed pipe, the copolymer reactive solution was heated to 105° C., and unreacted acrolein and MMA were distilled off together with ethyl acetate. Thereafter, new ethyl acetate was added to a concentrated solution, and a copolymer reactive solution was prepared so that the concentration of the solid content became 20 weight %.

A number-average molecular weight of the copolymer in the obtained copolymer solution was measured by the GPC. As a result, the number-average molecular weight of the copolymer was 5000, and the overall content of oligomers whose number-average molecular weight is below 1000 was 0.5% and below in an area ratio. Here, an infrared absorption spectrum of a solid obtained by desolvating the copolymer solution under reduced pressure is shown in FIG. 1.

Aqueous resin dispersion was prepared by using the above copolymer solution.

First, 693 g of ion exchanged water as an aqueous medium was poured into a prescribed container, and 6.9 g of 35 weight % aqueous solution of polyoxyethylene alkyl phenyl ether sodium sulfate (Kao Corp.; product name: Emal NC-35) as a surface-active agent was added to the ion exchanged water. Next, while the aqueous solution was being agitated at a rotary speed of 12000 rpm by using a homomixer (Tokushu Kika Kogyo Co., Ltd.; HV-M type), 300 g of the copolymer solution was added to the aqueous solution to be agitated for 5 minutes. An average particle diameter of the copolymer in the dispersion was 1 μm to 2 μm.

Next, the copolymer was further dispersed by applying a differential pressure of 500 bar to the dispersion by means of a microfluidizer (MIZUHO INDUSTRIAL Co., Ltd; M-110-EH type). An aqueous resin dispersion (1) was obtained by heating the obtained dispersion to 85° C. under reduced pressure and by desolvating it.

An average particle diameter (μm), concentration of solid content (weight %), concentration of unreacted acrolein (ppm) and a proportion to the solid content of the unreacted acrolein (weight %) in the obtained aqueous resin dispersion (1) were measured. The results are shown in Table 1. The aqueous resin dispersion (1) did not have any pungent smell, which is peculiar to acrolein, or any colour.

[EXAMPLE 2]

The same reaction and process as example 1 were carried out except that the usage of acrolein in the example 1 was changed from 72.0 g to 117.6 g (2.10 mol) and that the usage of MMA was changed from 128.5 g to 90.0 g (0.90 mol) so as to obtain a copolymer solution.

Figure 2:
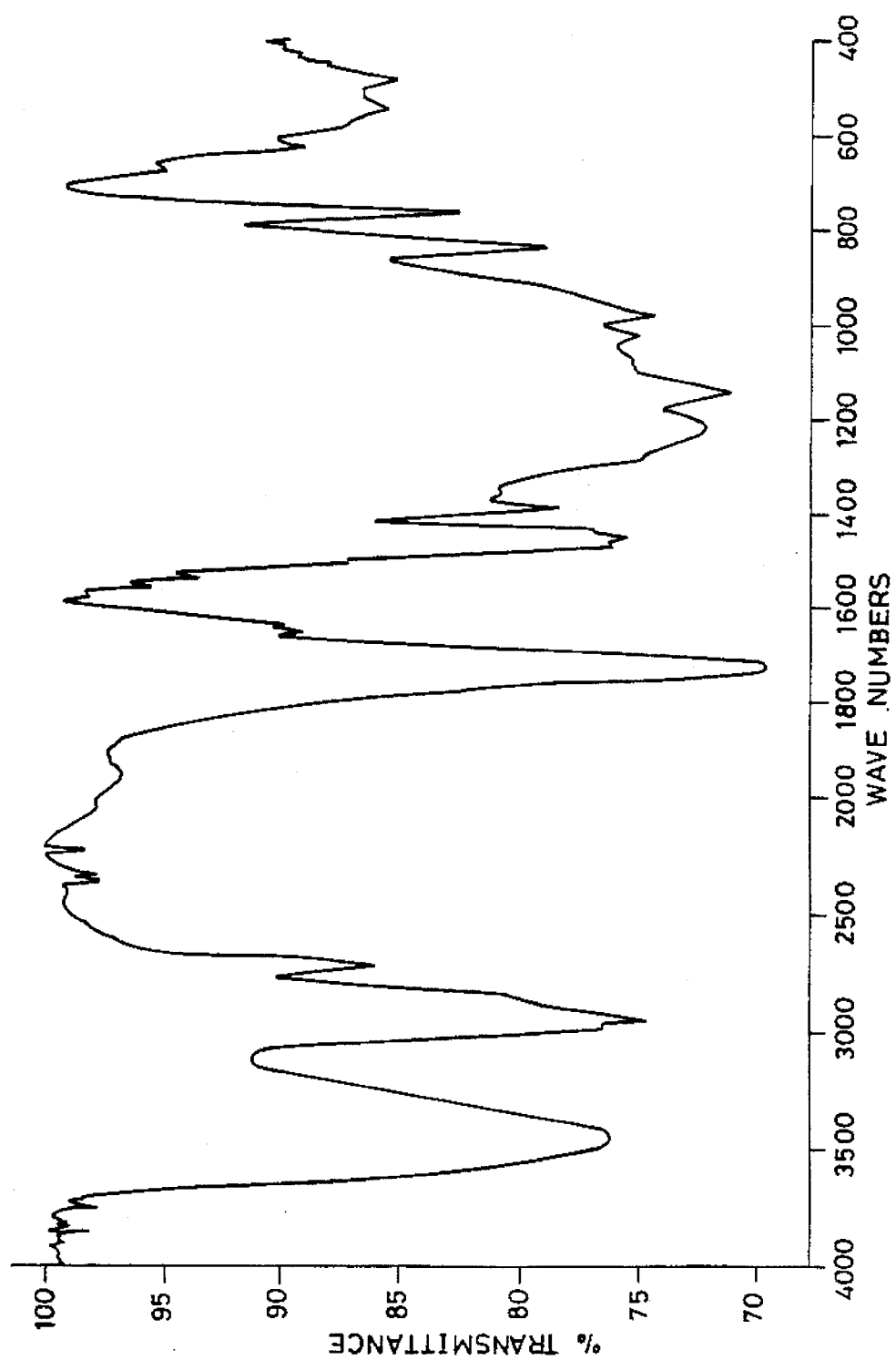
FIG. 2 shows an infrared absorption spectrum of a solid obtained in example 2.

Polymer conversions of the acrolein and the MMA calculated in the similar manner of the example 1 were respectively 55% and 84%. Moreover, an acrolein unit in the copolymer which was calculated from the polymer conversions accounted for 46 weight %. A number-average molecular weight of the copolymer in the obtained copolymer solution was 5000 and an overall content of oligomers was 0.5% and below in an area ratio. Here, an infrared absorption spectrum of a solid obtained by desolvating the copolymer solution under reduced pressure is shown in FIG. 2.

The same process as in example 1 was carried out by using the copolymer solution so that an aqueous resin dispersion (2) was prepared. Here, when a temperature of the copolymer solution becomes 40° C. and below, copolymer is separated out. For this reason, during elimination and dispersion process, the temperature of the copolymer solution was kept at 50° C.

The various measured results of the obtained aqueous resin dispersion (2) was shown in Table 1. The aqueous resin dispersion (2) did not have any pungent smell, which is peculiar to acrolein, or any colour.

[ EXAMPLE 3]

133.6 g (1.28 mol) of styrene as a vinyl monomer was used instead of 128.5 g of the MMA in example 1, and 200 g of toluene as an organic solvent was used instead of 200 g of the ethyl acetate. Further, the copolymer reactive solution was heated to 115° C. under reduced pressure of 400 mmHg, and unreacted acrolein and the styrene were distilled off together with the toluene. The similar reaction and process as in example 1 were carried out except that conditions of polymerization reaction and elimination process were changed as mentioned above so that a copolymer solution was obtained.

Polymer conversions of the acrolein and styrene calculated in the same manner as in example 1 were respectively 94% and 86%. Moreover, an acrolein unit in copolymer which was calculated from the polymer conversions accounted for 37 weight %. A number-average molecular weight of the copolymer in the obtained copolymer solution was 5000, and an overall content of an oligomers was 0.5% and below in an area ratio.

The same process as in example 1 was carried out by using the copolymer solution so that an aqueous resin dispersion (3) was prepared. Various measured results of the obtained aqueous resin dispersion (3) are shown in Table 1. The aqueous resin dispersion (3) did not have any pungent smell, which is peculiar to the acrolein, or any colour.

[Example 4]

The same reaction and process as in example 1 were carried out except that an usage of the acrolein was changed from 72.0 g to 70.0 g (1.25 mol) and that 30.2 g (0.30 mol) of the MMA and 100.6 g (0.78 mol) of butyl acrylate were used as a vinyl monomer instead of 128.5 g of the MMA, so that a copolymer solution was obtained.

Polymer conversions of the acrolein, MMA and butyl acrylate calculated in the same manner as in example 1 were respectively 71%, 87% and 61%. Moreover, an acrolein unit in a copolymer which was calculated from the polymer conversions accounted for 36 weight %. A number-average molecular weight of the copolymer in the obtained copolymer solution was 5000, and an overall content of an oligomer was 0.5% and below in an area ratio.

The same process as in example 1 was carried out by using the copolymer solution so that an aqueous resin dispersion (4) was prepared. Various measured results of the obtained aqueous resin dispersion (4) are shown in Table 1. The aqueous resin dispersion (4) did not have any pungent smell, which is peculiar to the acrolein, or any colour.

[Example 5]

The same reaction and process as in example 1 were carried out except that an elimination process that the unreacted acrolein and the MMA were distilled off together with ethyl acetate in example 1 was omitted, so that a copolymer solution was obtained.

The same process as in example 1 was carried out by using the copolymer solution so that an aqueous resin dispersion (5) was prepared. However, when the obtained dispersion was desolvated, unreacted acrolein and MMA were distilled off together with ethyl acetate.

Various measured results of the obtained aqueous resin dispersion (5) are shown in Table 1. The aqueous resin dispersion (5) did not have any pungent smell, which is peculiar to the acrolein, or any colour.

[Examples 6 Through 10]

The same reaction and process as in examples 1 through 5 were carried out except that 2.4 g of powdered sodium lauryl sulfate (Kao Corp.; product name: Emal 0) as a surface-active agent was used instead of 6.9 g of the 35 weight % aqueous solution of the polyoxyethylene alkyl phenyl ether sodium sulfate in examples 1 through 5, so that aqueous resin dispersions (6) through (10) were prepared.

Various measured results of the obtained aqueous resin dispersions (6) through (10) are shown in Table 1. The aqueous resin dispersions (6) through (10) did not have any pungent smell, which is peculiar to the acrolein, or any colour.

[Examples 11 Through 15]

The same reactions and processes as in examples 1 through 5 were carried out except that differential pressure in examples 1 through 5, which was applied to the microfluidizer when the dispersion was dispersed, was changed from 500 bar to 300 bar, so that aqueous resin dispersions (11) through (15) were prepared.

Various measured results of the obtained aqueous resin dispersions (11) through (15) are shown in Table 1. The aqueous resin dispersions (11) through (15) did not have any pungent smell, which is peculiar to the acrolein, or any colour.

[Example 16]

The same reaction and process as in example 1 were carried out except that 248.7 g (1.94 mol) of butyl acrylate as a vinyl monomer was used instead of 128.5 g of the MMA in example 1, the usage of the ethyl acetate was changed from 200 g to 320 g and the usage of the azobis (dimethylvaleronitrile) was changed from 6.4 g to 8.0 g, so that a copolymer solution was obtained.

Polymer conversions of the acrolein and butyl acrylate calculated in the same manner as in example 1 were respectively 90% and 73%. Moreover, an acrolein unit in a copolymer which was calculated from the polymer conversions accounted for 26 weight %. A number-average molecular weight of the copolymer in the obtained copolymer solution was 5000, and an overall content of an oligomer was 0.5% and below in an area ratio.

The same process as in example 1 was carried out by using the copolymer solution so that an aqueous resin dispersion (16) was prepared. Various measured results of the obtained aqueous resin dispersion (16) are shown in Table 1. The aqueous resin dispersion (16) did not have any pungent smell, which is peculiar to the acrolein, or any colour.

[Example 17]

The same reaction and process as in example 1 were carried out except that the usage of the acrolein was changed from 72.0 g to 28.7 g (0.51 mol), the usage of the MMA from 128.5 g to 204.8 g (2.05 mol) and the usage of the ethyl acetate from 200 g to 250 g, so that an aqueous resin dispersion (17) was prepared. Polymer conversions of the acrolein and the MMA calculated in the same manner as in example 1 were 89% and 90%. Moreover, an acrolein unit in a copolymer obtained from the polymer conversions accounted for 12 weight %.

Various measured results of the obtained aqueous resin dispersion (17) are shown in Table 1. The aqueous resin dispersion (17) did not have any pungent smell, which is peculiar to the acrolein, or any colour.

[Comparative Example 1]

A 300 ml flask to which a reflux condenser and an agitator are installed was used as a reactor. After nitrogen was substituted in the reactor, 180 g of ion exchanged water (aqueous medium), 0.4 g of potassium persulfate (polymerization initiator) and 1.9 g of sodium dodecyl sulfate (surface-active agent) were prepared in the reactor. Next, 11.0 g (0.20 mol) of acrolein and 20.4 g (0.20 mol) of styrene (vinyl monomer) were put into the reactor as they were being agitated.

The reactive solution was heated to 50° C. and was agitated for 6 hours. Then, the reactive solution was polyreacted. Polymer conversions of the acrolein and the styrene in the polyreaction were respectively 62% and 42%. An acrolein unit in copolymer which was calculated from the polymer conversions accounted for 44 weight %.

Successively, after the reflux condenser in the reactor was replaced by a condensed pipe, the reactive solution was heated to 100° C., and unreacted acrolein and styrene were distilled off together with water. Thereafter, 88 g of an aqueous resin dispersion for comparison was obtained.

The obtained aqueous resin dispersion for a comparison was dissolved in fairly surplus tetrahydrofuran, and a number-average molecular weight of copolymer in the aqueous resin dispersion was measured by GPC. As a result, the number-average molecular weight of the copolymer was 6000, but the content of the oligomer whose number-average molecular weight is below 1000 was no less than 15% in an area ratio. In other words, it was found that the content of the oligomer is extremely great.

Various measured results of the aqueous resin dispersion for comparison are shown in Table 1. The aqueous resin dispersion had a strong pungent smell which is peculiar to acrolein and was coloured dark brown while the water was distilled off.

TABLE 1

| Example | Average particle diameter (μm) | Concentration of solid content (weight %) | Concentration of unreacted acrolein (ppm) | Ratio of unreacted acrolein to solid content (weight %) |
| --- | --- | --- | --- | --- |
| 1 | 0.02 | 10.5 | 8.0 | 0.0076 |
| 2 | 0.03 | 10.8 | 10.1 | 0.0094 |
| 3 | 0.04 | 15.4 | 3.0 | 0.0019 |
| 4 | 0.03 | 17.0 | 2.3 | 0.0014 |
| 5 | 0.03 | 10.6 | 9.1 | 0.0091 |
| 6 | 0.01 | 10.3 | 7.8 | 0.0075 |
| 7 | 0.02 | 10.5 | 9.8 | 0.0093 |
| 8 | 0.03 | 16.4 | 3.2 | 0.0020 |
| 9 | 0.02 | 16.7 | 2.2 | 0.0013 |
| 10 | 0.02 | 10.2 | 7.8 | 0.0076 |
| 11 | 0.07 | 10.2 | 8.3 | 0.0081 |
| 12 | 0.07 | 10.4 | 9.9 | 0.0095 |
| 13 | 0.09 | 15.8 | 3.4 | 0.0022 |
| 14 | 0.07 | 16.3 | 2.4 | 0.0015 |
| 15 | 0.07 | 10.4 | 8.2 | 0.0079 |
| 16 | 0.03 | 10.6 | 9.1 | 0.0085 |
| 17 | 0.02 | 10.3 | 9.5 | 0.0092 |
| Comparative example 1 | 0.02 | 20.0 | 440.0 | 0.2200 |

[Example 18]

The aqueous resin dispersion (1) obtained in example 1 was used as a water-resistant improver.

First, ion exchanged water was poured into a prescribed container, and polyvinyl alcohol on the market (KURARAY Co., LTD.; product name: polyvinyl alcohol PVA-117; saponification substance—98.5%, polymerization degree—1700) was dissolved in the ion exchanged water so that an aqueous solution whose concentration of a solid content becomes 10 weight % was prepared. Next, the aqueous resin dispersion (1) was added to and mixed with the aqueous solution so that load of the aqueous resin dispersion (1) to the solid content of the polyvinyl alcohol became 30 weight % in a solid content conversion. As a result, a preparation solution was obtained.

In addition, the same process as the above was carried out so that a preparation solution in which the load of the aqueous resin dispersion (1) was 50 weight % in a solid content conversion was obtained.

Next, each obtained preparation solution was applied to a Teflon™ plate and it was dried under the following conditions so that films whose thickness was uniformly 0.1mm were made. The drying conditions were as follows:

(1) at 25° C. for a day;

(2) at 25° C. for 7 days;

(3) at 50° C. for 12 hours;

(4) at 50° C. for 3 days;

(5) at 100° C. for 1 hour; and (6) at 100° C. for 12 hours.

The films obtained under the respective drying conditions were cut to have a width of 15 mm and a length of 40 mm, and they were soaked for 10 minutes in ion exchanged water of 25° C. An eluation coefficient (%) and a swelling coefficient (%) of the films were measured according to the following formulas. The results are shown in Tables 2 through 4.

Eluation coefficient (%) =

$$\frac{\text{Drying weight of film before soaking} - \text{Drying weight of film after soaking}}{\text{Drying weight of film before soaking}} \times 100$$

Swelling coefficient (%) =

$$\frac{\text{Wet weight of film after soaking} - \text{Drying weight of film after soaking}}{\text{Drying weight of film after soaking}} \times 100$$

Examples 19 Through 23]

The same process as in example 18 was carried out except that the aqueous resin dispersions (2) through (5) and (16) obtained in examples 2 through 5 and 16 were used instead of the aqueous resin dispersion (1) so that respective corresponding preparation solutions (2 kinds for each, a total of 10 kinds) were obtained.

Next, each obtained preparation solution was dried under the same drying condition as in example 18 so that films whose thickness was uniformly 0.1 mm were made. An eluation coefficient (%) and a swelling coefficient (%) of the obtained films were measured. The results are shown in Tables 2 through 4.

[Comparative Example 2]

The same reaction and process as in example 1 were carried out except that the usage of the acrolein was changed from 72.0 g to 11.2 g (0.20 mol) and the usage of the MMA from 128.5 g to 200.2 g (2.00 mol) so that a copolymer solution was obtained. Polymer conversions of the acrolein and the MMA calculated in the same manner as in example 1 were respectively 89% and 86%. Furthermore, an acrolein unit in the copolymer which was calculated from the polymer conversions accounted for 5 weight %. A number-average molecular weight of the copolymer in the obtained copolymer solution was 5000, and an overall content of oligomers was 0.5% and below in an area ratio.

The same process as in example 1 was carried out by using the copolymer solution so that an aqueous resin dispersion for comparison was prepared. As to the aqueous resin dispersion for comparison, an average particle diameter was 0.03 µm, concentration of a solid content was 13.4 weight %, concentration of unreacted acrolein was 4.2 ppm and a ratio of the unreacted acrolein to a solid content was 0.0031 weight %.

Next, the same process as in example 18 was carried out except that the aqueous resin dispersion for comparison was used instead of the aqueous resin dispersion (1) so that corresponding preparation solutions (two kinds) was obtained.

Next, each obtained preparation solution was dried under the same drying condition as in example 18 so that films whose thickness was uniformly 0.1 mm were made. An eluation coefficient (%) and a swelling coefficient (%) of the obtained films were measured. The results are shown in Tables 2 through 4.

In addition, a preparation solution to which the aqueous resin dispersion (1) was not added, namely, an aqueous solution in which only polyvinyl alcohol was dissolved was dried under the same drying condition as in example 18 so that films whose thickness was uniformly 0.1 mm were made. An eluation coefficient (%) and a swelling coefficient (%) of the obtained films were measured. The results are shown as blank in Tables 2 through 4.

TABLE 2

| Example | Aqueous resin dispersion | Load of aqueous resin dispersion (weight %) | Drying condition of film | | | |
|---|---|---|---|---|---|---|
| | | | At 25° C. for 1 day | | At 35° C. for 7 days | |
| | | | Eluation coefficient (%) | Swelling coefficient (%) | Eluation coefficient (%) | Swelling coefficient (%) |
| 18 | (1) | 30 | 23.5 | 1086 | 22.2 | 928 |
| | | 50 | 21.3 | 874 | 22.1 | 667 |
| 19 | (2) | 30 | 20.2 | 950 | 20.1 | 836 |
| | | 50 | 19.6 | 810 | 19.2 | 615 |
| 20 | (3) | 30 | 21.4 | 1011 | 20.6 | 903 |
| | | 50 | 20.1 | 829 | 19.8 | 620 |
| 21 | (4) | 30 | 19.3 | 832 | 18.4 | 785 |
| | | 50 | 19.2 | 750 | 18.2 | 579 |
| 22 | (5) | 30 | 24.2 | 1039 | 22.8 | 934 |
| | | 50 | 20.4 | 901 | 21.4 | 625 |
| 23 | (16) | 30 | 19.4 | 825 | 18.8 | 770 |
| | | 50 | 19.2 | 722 | 18.7 | 587 |
| Comparative example 2 | Aqueous resin dispersion for comparison | 30 | 28.0 | 1475 | 25.2 | 1214 |
| | | 50 | 24.2 | 1296 | 23.8 | 1126 |
| Blank | | | 38.8 | 2791 | 29.8 | 1924 |

TABLE 3

| Example | Aqueous resin dispersion | Load of aqueous resin dispersion (weight %) | Drying condition of film | | | |
|---|---|---|---|---|---|---|
| | | | At 50° C. for 12 hours | | At 50° C. for 3 days | |
| | | | Eluation coefficient (%) | Swelling coefficient (%) | Eluation coefficient (%) | Swelling coefficient (%) |
| 18 | (1) | 30 | 15.5 | 605 | 7.4 | 432 |
| | | 50 | 14.6 | 526 | 6.6 | 325 |
| 19 | (2) | 30 | 11.3 | 511 | 6.5 | 386 |
| | | 50 | 9.5 | 435 | 5.4 | 278 |
| 20 | (3) | 30 | 14.4 | 573 | 6.9 | 411 |
| | | 50 | 13.0 | 502 | 6.0 | 302 |
| 21 | (4) | 30 | 8.1 | 449 | 5.4 | 267 |
| | | 50 | 6.2 | 378 | 4.8 | 189 |
| 22 | (5) | 30 | 15.6 | 611 | 8.0 | 434 |
| | | 50 | 14.4 | 512 | 6.4 | 303 |
| 23 | (16) | 30 | 8.2 | 434 | 5.8 | 288 |
| | | 50 | 6.4 | 363 | 4.4 | 198 |
| Comparative example 2 | Aqueous resin dispersion for comparison | 30 | 19.2 | 1405 | 10.2 | 1234 |
| | | 50 | 18.6 | 1296 | 9.2 | 1026 |
| Blank | | | 20.4 | 1505 | 16.3 | 1498 |

TABLE 4

| Example | Aqueous resin dispersion | Load of aqueous resin dispersion (weight %) | Drying condition of film | | | |
|---|---|---|---|---|---|---|
| | | | At 100° C. for 1 hour | | At 100° C. for 12 hours | |
| | | | Eluation coefficient (%) | Swelling coefficient (%) | Eluation coefficient (%) | Swelling coefficient (%) |
| 18 | (1) | 30 | 4.3 | 174 | 3.3 | 165 |
| | | 50 | 3.4 | 141 | 2.2 | 113 |
| 19 | (2) | 30 | 4.1 | 148 | 3.0 | 124 |
| | | 50 | 3.2 | 130 | 2.4 | 91 |
| 20 | (3) | 30 | 4.3 | 161 | 3.2 | 148 |
| | | 50 | 3.3 | 132 | 2.2 | 101 |
| 21 | (4) | 30 | 3.9 | 139 | 2.5 | 95 |
| | | 50 | 3.2 | 125 | 2.2 | 87 |
| 22 | (5) | 30 | 4.3 | 172 | 3.2 | 164 |
| | | 50 | 3.3 | 139 | 2.2 | 123 |
| 23 | (16) | 30 | 4.0 | 137 | 2.2 | 96 |
| | | 50 | 3.0 | 127 | 1.8 | 82 |
| Comparative example 2 | Aqueous resin dispersion for comparison | 30 | 6.1 | 305 | 3.8 | 244 |
| | | 50 | 5.6 | 226 | 2.4 | 206 |
| Blank | | | 8.4 | 366 | 4.2 | 323 |

As is clear from the results of the examples 18 through 23, the comparative example 2 and the blanks shown in Tables 2 through 4, the film in which the aqueous resin dispersion of the present invention was used as a water-resistant improver obtained a low eluation coefficient and a low swelling coefficient. In other words, it was found that the water-resistant improver has excellent water resistance function.

[Example 24]

The aqueous resin dispersion (1) obtained in example 1 was used as a water-resistant improver.

First, ion exchanged water was poured into a prescribed container, and polyvinyl alcohol on the market (KURARAY CO., LTD.; product name: polyvinyl alcohol PVA-117; saponification substance—98.5%, polymerization degree—1700) was dissolved in the ion exchanged water so that an aqueous solution whose concentration of a solid content is 10 weight % was prepared. Next, the aqueous resin dispersion (1) was added to and mixed with the aqueous solution so that the load of the aqueous resin dispersion (1) to the solid content of the polyvinyl alcohol became 50 weight % in a solid content conversion.

The mixture was divided equally into two, paratoluenesulfonic acid as an acid catalyst was added to each mixture so that the loads to the solid content of the aqueous resin dispersion (1) became 0 weight % (without adding) and 5 weight %. As a result, preparation solutions (two kinds) were obtained.

Next, each obtained preparation solution was applied to a Teflon™ plate and it was dried under various conditions mentioned below so that films whose thickness was uniformly 0.1 mm were made. The drying conditions were as follows:

(1) at 25° C. for a day; and
(2) at 50° C. for 12 hours.

The films obtained under respective drying conditions were cut so as to have a width of 15 mm and a length of 40 mm, and they were soaked in ion exchanged water of 25° C. for 10 minutes. Then, an eluation coefficient (%) and a swelling coefficient (%) of the films were measured. The results are shown in Table 5.

TABLE 5

| | | Drying condition of film | | | |
|---|---|---|---|---|---|
| | Load of paratoluene | At 25° C. for 1 day | | At 50° C. for 12 hours | |
| Example | sulfonic acid (weight %) | Eluation coefficient (%) | Swelling coefficient (%) | Eluation coefficient (%) | Swelling coefficient (%) |
| 24 | 0 (without addition) | 21.3 | 874 | 14.6 | 526 |
| | 5 | 9.2 | 161 | 4.0 | 87 |

As is clear from the results of example 24 shown in Table 5, the films in which the aqueous resin dispersion of the present invention was used as a water-resistant improver obtained further lower eluation coefficient and swelling coefficient by adding paratoluensulfonic acid as an acid catalyst. In other words, the water-resistant improver is effective when it and acid catalyst are used together. Therefore, it was found that the water-resistant improver remarkably displays excellent water resistance function by adding 5 weight % of the acid catalyst.

[Example 25]

The aqueous resin dispersion (1) obtained in example 1 was used as a water-resistant improver.

First, polyvinyl acetate resin emulsion on the market (Konishi Co., Ltd.; product name: Bond for woodwork CH18, solid content: 40 weight %) was put into a prescribed container, and the emulsion was diluted by adding ion exchanged water so that an aqueous solution whose concentration of a solid content was 10 weight % was prepared. Next, the aqueous resin dispersion (1) was added to and mixed with the aqueous solution so that the load of the aqueous resin dispersion (1) to the solid content of the emulsion became 5 weight %. As a result, a preparation solution was obtained.

In addition, the same process as the above was carried out so that a preparation solution in which the load of the aqueous resin dispersion (1) was 10 weight % in a solid content conversion was obtained.

Next, each obtained preparation solution was applied to a Teflon™ plate and was dried under 2 kinds of conditions mentioned below so that films whose thickness was uniformly 0.1 mm were made. The drying conditions were as follows:

(1) at 25° C. for one day;
(2) at 50° C. for 12 hours; and
(3) at 100° C. for 2 hours.

The films obtained under each drying condition were cut so as to have a width of 15 mm and a length of 40 mm, and they were soaked in ion exchanged water of 60° C. for 4 hours. Then, an eluation coefficient (%) and a swelling coefficient (%) of the obtained films were measured. The results are shown in Tables 6 through 8.

[Examples 26 Through 31]

The same process as in example 25 was carried out except that the aqueous resin dispersions (2) through (5), (16) and (17) obtained in examples 2 through 5, 16 and 17 were used instead of the aqueous resin dispersions (1) so that respective corresponding preparation solutions (2 kinds for each, a total of 12 kinds) were obtained.

Next, each obtained preparation solution was dried under the same drying condition as in example 25 so that films whose thickness was uniformly 0.1 mm were made. An eluation coefficient (%) and a swelling coefficient (%) of the obtained films were measured. The results are shown in Tables 6 through 8.

[Comparative Example 3]

The same process as in example 25 was carried out except that the aqueous resin dispersion for comparison obtained in comparative example 2 was used instead of the aqueous resin dispersion (1) so that respective corresponding preparation solutions (2 kinds) were obtained.

Next, each obtained preparation solution was dried under the same drying condition as in example 25 so that films whose thickness was uniformly 0.1 mm were made. An eluation coefficient (%) and a swelling coefficient (%) of the obtained films were measured. The results are shown in Tables 6 through 8.

In addition, a preparation solution to which the aqueous resin dispersion (1) was not added, namely, an aqueous solution obtained by diluting only polyvinyl acetate resin emulsion with ion exchanged water was dried under the same drying condition as in example 25 so that films whose thickness was uniformly 0.1 mm were made. An eluation coefficient (%) and a swelling coefficient (%) of the obtained films were measured. Moreover, states of the films after soaking were observed. The results are shown as blank in Tables 6 through 8.

[Comparative Example 4]

The same process as in example 25 was carried out except that glyoxal (Wako Pure Chemical Industries, Ltd.; 40 weight % aqueous solution for chemical) was used instead of the aqueous resin dispersion (1) so that respectively corresponding preparation solutions (2 kinds) were obtained.

Next, each obtained preparation solution was dried under the same drying conditions as in example 25 so that films whose thickness was uniformly 0.1 mm were made. An eluation coefficient (%) and a swelling coefficient (%) of the obtained films were measured. Moreover, states of the films after soaking were observed. The results are shown in Tables 6 through 8.

TABLE 6

| Example | Aqueous resin dispersion | Load of aqueous resin dispersion (weight %) | Drying condition of film At 25° C. for 1 day Eluation coefficient (%) | Swelling coefficient (%) | State of film after soaking |
|---|---|---|---|---|---|
| 25 | (1) | 5 | 10.2 | 103 | Both are |
|  |  | 10 | 10.0 | 96 | very firm |
| 26 | (2) | 5 | 9.0 | 85 | Both are |
|  |  | 10 | 8.3 | 80 | very firm |
| 27 | (3) | 5 | 9.8 | 98 | Both are |
|  |  | 10 | 9.4 | 93 | very firm |
| 28 | (4) | 5 | 8.5 | 82 | Both are |
|  |  | 10 | 7.9 | 77 | very firm |
| 29 | (5) | 5 | 10.3 | 105 | Both are |
|  |  | 10 | 9.9 | 98 | very firm |
| 30 | (16) | 5 | 8.4 | 83 | Both are |
|  |  | 10 | 8.0 | 78 | very firm |
| 31 | (17) | 5 | 16.4 | 190 | Both are |
|  |  | 10 | 15.7 | 174 | very firm |
| Comparative example 3 | Aqueous resin dispersion for comparison | 5 | 17.8 | 210 | Both are weak |
|  |  | 10 | 16.7 | 194 |  |
| Comparative example 4 | Glyoxal | 5 | 21.9 | 315 | Both are very fragile |
|  |  | 10 | 22.1 | 322 |  |
| Blank |  |  | 19.8 | 310 | Very fragile |

TABLE 7

| Example | Aqueous resin dispersion | Load of aqueous resin dispersion (weight %) | Drying condition of film At 50° C. for 12 hours Eluation coefficient (%) | Swelling coefficient (%) | State of film after soaking |
|---|---|---|---|---|---|
| 25 | (1) | 5 | 9.0 | 90 | Both are |
|  |  | 10 | 8.5 | 83 | very firm |
| 26 | (2) | 5 | 7.3 | 77 | Both are |
|  |  | 10 | 7.0 | 75 | very firm |
| 27 | (3) | 5 | 8.6 | 86 | Both are |
|  |  | 10 | 8.1 | 81 | very firm |
| 28 | (4) | 5 | 7.0 | 72 | Both are |
|  |  | 10 | 6.7 | 69 | very firm |
| 29 | (5) | 5 | 9.0 | 89 | Both are |
|  |  | 10 | 8.4 | 83 | very firm |
| 30 | (16) | 5 | 6.9 | 73 | Both are |
|  |  | 10 | 6.7 | 70 | very firm |
| 31 | (17) | 5 | 14.5 | 168 | Both are |
|  |  | 10 | 13.9 | 157 | very firm |
| Comparative example 3 | Aqueous resin dispersion for comparison | 5 | 16.7 | 201 | Both are weak |
|  |  | 10 | 14.8 | 187 |  |
| Comparative example 4 | Glyoxal | 5 | 19.6 | 289 | Both are very fragile |
|  |  | 10 | 20.9 | 312 |  |
| Blank |  |  | 18.9 | 305 | Very fragile |

TABLE 8

| Example | Aqueous resin dispersion | Load of aqueous resin dispersion (weight %) | Drying condition of film At 100° C. for 2 hours Eluation coefficient (%) | Swelling coefficient (%) | Film state after soaking |
|---|---|---|---|---|---|
| 25 | (1) | 5 | 7.0 | 70 | Both are |
|  |  | 10 | 6.1 | 65 | very firm |
| 26 | (2) | 5 | 5.8 | 61 | Both are |
|  |  | 10 | 5.4 | 59 | very firm |
| 27 | (3) | 5 | 6.0 | 68 | Both are |
|  |  | 10 | 5.7 | 64 | very firm |
| 28 | (4) | 5 | 5.0 | 52 | Both are |
|  |  | 10 | 4.6 | 49 | very firm |
| 29 | (5) | 5 | 7.0 | 69 | Both are |
|  |  | 10 | 6.2 | 64 | very firm |
| 30 | (16) | 5 | 5.1 | 55 | Both are |
|  |  | 10 | 4.7 | 51 | very firm |
| 31 | (17) | 5 | 12.9 | 157 | Both are |
|  |  | 10 | 11.2 | 142 | very firm |
| Comparative example 3 | Aqueous resin dispersion for comparison | 5 | 16.1 | 191 | Both are weak |
|  |  | 10 | 14.1 | 180 |  |
| Comparative example 4 | Glyoxal | 5 | 16.2 | 284 | Both are very fragile |
|  |  | 10 | 17.5 | 290 |  |
| Blank |  |  | 17.0 | 296 | Very fragile |

As is clear from the results of the examples 25 through 31, the comparative examples 3 and 4 and the blank shown in Tables 6 through 8, the films in which the aqueous resin dispersion of the present invention were used as a water-resistant improver obtained a low eluation coefficient and a low swelling coefficient. Furthermore, as is clear from the results obtained by observing film state after the soaking, mechanical strength of the film was much stronger and more excellent when the water-resistant improver was used than when glyoxal which was a conventional water-resistant improver was used. In other words, it was found that the water-resistant improver has an excellent water resistance function as compared to glyoxal.

[Example 32]

The aqueous resin dispersion (1) obtained in example 1 was used as a water-resistant improver.

First, 20 g of ion exchanged water was poured into a prescribed container and 10 g of corn starch powder (drying weight) as starch was dispersed in the ion exchanged water. Next, the aqueous resin dispersion (1) was added to the above dispersion so that the load of the aqueous resin dispersion (1) to the corn starch powder becomes 10 weight % in a solid content conversion, and the aqueous resin dispersion (1) was mixed with the dispersion. Successively, the mixed solution was dried at 100° C. for 3 hours. Then, denatured starch was obtained by grinding an obtained solid material using a mortar.

Next, 250 mg of the denatured starch, 1 g of quantitative filter paper (TOYO ROSHI Co., Ltd; product No. 5C) and 300 g of ion exchanged water were put into a breaker and they were mixed so that the quantitative filter paper was cracked. Successively, the mixture was filtered by means of KIRIYAMA funnel whose diameter is 60 mm and a pulp board was obtained.

A component was obtained by pressing the pulp board using a heat press under the conditions of 110° C., 20 kgf/cm$^2$ and 7 minutes. Successively the component was cut in a width of 10 mm and a length of 40 mm so as to obtain test pieces. The tensile strength (kgf) of the test pieces (hereinafter, referred to as tensile strength (a)) was measured by using an Instron tester. Moreover, after another test piece was soaked in the ion exchanged water of 20° C. for 30 minutes, the tensile strength (kgf) of the test piece (hereinafter, referred to as tensile strength (b)) was measured. Furthermore, after another test piece was left in a thermo-hygrostat whose temperature was 40° C. and relative humidity was 90% for 3 days, the tensile strength (kgf) of the test piece (hereinafter, referred to as tensile strength (c)) was measured.

In addition, after another test piece was soaked in 20° C. of the ion exchanged water for 30 minutes, the water absorption magnification (g/g) of the test piece (hereinafter, referred to as water absorption magnification (a)) was measured according to the following formula from weights of the test piece before and after the immersion. Similarly, after another test piece was left in a thermo-hygrostat whose temperature was 40° C. and relative humidity was 90% for 3 days, the water absorption magnification (g/g) of the test piece (hereinafter, referred to as water absorption magnification (b)) was measured according to the following formula from weights of the test piece before and after the test piece was left in the thermo-hygrostat. The results are shown in Table 9.

Water absorption magnification (g/g) =

$$\frac{\text{Weight of a test piece after test (g)} - \text{Weight of a test piece before test (g)}}{\text{Weight of a test piece before test (g)}} \times 100$$

[Example 33]

The same process as in example 32 was carried out except that the load of the aqueous resin dispersion (1) was changed from 10 weight % to 30 weight % in a solid content conversion so that denatured starch was obtained.

Next, the same process as in the example 32 was carried out by using the obtained denatured starch so that test pieces were made. The tensile strengths (a) through (c) and the water absorption magnifications (a) and (b) of the obtained test pieces were measured in a like manner as in example 32. The results are shown in Table 9.

[Example 34]

The same process as in example 32 was carried out except that the aqueous resin dispersion (16) was used instead of the aqueous resin dispersion (1) so that denatured starch was obtained.

Next, the same process as in example 32 was carried out by using the obtained denatured starch so that test pieces were made. The tensile strengths (a) through (c) and the water absorption magnifications (a) and (b) of the obtained test pieces were measured in a like manner as in example 32. The results are shown in Table 9.

[Example 35]

The same process as in example 32 was carried out except that the aqueous resin dispersion (16) was used instead of the aqueous resin dispersion (1) and that the load of the aqueous resin dispersion (16) is 30 weight % in a solid content conversion so that denatured starch was obtained.

Next, the same process as in example 32 was carried out by using the obtained denatured starch so that test pieces were made. The tensile strengths (a) through (c) and the water absorption magnifications (a) and (b) of the obtained test pieces were measured in a like manner as in example 32. The results are shown in Table 9.

[Comparative Example 5]

The same process as in example 32 was carried out except that the aqueous resin dispersion for comparison obtained in comparative example 2 was used instead of the aqueous resin dispersion (1) so that denatured starch for comparison was obtained.

Next, the same process as in the example 32 was carried out by using the obtained denatured starch for comparison so that test pieces were made. The tensile strengths (a) through (c) and the water absorption magnifications (a) and (b) of the obtained test pieces were measured in a like manner as in example 32. The results are shown in Table 9.

[Comparative Example 6]

The same process as in example 32 was carried out except that the aqueous resin dispersion for comparison obtained in comparative example 2 was used instead of the aqueous resin dispersion (1) and that the load of the aqueous resin dispersion for comparison is 30 weight % in a solid content conversion so that denatured starch for comparison was obtained.

Next, the same process as in example 32 was carried out by using the obtained denatured starch for comparison so that test pieces were made. The tensile strengths (a) through (c) and the water absorption magnifications (a) and (b) of the obtained test pieces were measured in a like manner of in example 32. The results are shown in Table 9.

[Comparative Example 7]

The same process as in example 32 was carried out except that the aqueous resin dispersion (1) was not used so that test pieces were made. In other words, the same process as in the example 32 was carried out by using original corn starch powder as the denatured starch for comparison so that the test pieces were made. The tensile strengths (a) through (c) and the water absorption magnifications (a) through (b) of the obtained test pieces were measured in a like manner as in example 32. The results are in Table 9.

TABLE 9

| Example | Tensile strength (a) (kgf) | Tensile strength (b) (kgf) | Tensile strength (c) (kgf) | Water absorption magnification (a) (g/g) | Water absorption magnification (b) (g/g) |
|---|---|---|---|---|---|
| 32 | 13.5 | 0.39 | 8.5 | 1.05 | 0.069 |
| 33 | 16.6 | 0.60 | 10.5 | 0.85 | 0.045 |
| 34 | 14.0 | 0.41 | 8.8 | 1.03 | 0.067 |
| 35 | 17.0 | 0.63 | 10.8 | 0.83 | 0.043 |
| Comparative example 5 | 11.5 | 0.29 | 7.5 | 1.15 | 0.080 |
| 7 (Blank) | 12.0 | 0.30 | 7.7 | 1.10 | 0.079 |
| | 10.1 | 0.27 | 7.2 | 1.20 | 0.085 |

As is clear from examples 32 through 35 and comparative example 5 through 7 shown in Table 9, as to the test pieces in which the aqueous resin dispersion of the present invention was used as a water-resistant improver, namely, the moldings, the tensile strength (a) through (c) are excellent and also the water absorption magnification (a) and (b) became small. In other words, the aqueous resin dispersion has more excellent water resistance function than conventional aqueous resin dispersion.

[Example 36]

The aqueous resin dispersion (1) obtained in the example 1 was used as a water-resistant improver.

First, 2 g of ion exchanged water was poured into a prescribed container, and 100 mg (drying weight) of corn starch powder as starch, 1 g of pulp powder (NIPPON PAPER INDUSTRIES; Product No. KC flock W-400) and 30 mg in a solid content conversion of the aqueous resin dispersion (1) were added to the ion exchanged water and they were mixed so as to have a slurry mixture.

Next, the slurry was applied to a Teflon™ plate and was dried at 100° C. for 3 hours so that a component was made.

The obtained component was immersed in the ion exchanged water of 20° C. for 3 days and a water absorption magnification (g/g) of the component (hereinafter, referred to as water absorption magnification (c)) was measured according to the above-mentioned formula from weights of the component before and after the immersion. Similarly, another component was left in a thermo-hygrostat whose temperature was 40° C. and relative humidity was 90% for 3 days, and a water absorption magnification (g/g) of the component (hereinafter, referred to as water absorption magnification (d)) was measured according to the above-mentioned formula from weights of the component before and after being left in the thermo-hygrostat. The results are shown in Table 10.

[Example 37]

The same process as in the example 36 was carried out except that the aqueous resin dispersion (16) was used instead of the aqueous resin dispersion (1) so that moldings were made. Water absorption magnifications (c) and (d) of the obtained moldings were measured in a like manner as in example 36. The results are shown in Table 10.

[Comparative Example 8]

The same process as in example 36 was carried out except that the aqueous resin dispersion for comparison obtained in the comparative example 2 was used instead of the aqueous resin dispersion (1) so that moldings were made. Water absorption magnifications (c) and (d) of the obtained moldings were measured in a like manner as in example 36. The results are shown in Table 10.

[Comparative Example 9]

The same process as in example 36 was carried out except that the aqueous resin dispersion (1) was not used so that moldings were made. Water absorption magnifications (c) and (d) of the obtained moldings were measured in a like manner as in example 36. The results are shown as Blank in Table 10.

TABLE 10

| Example | Water absorption magnification (c) (g/g) | Water absorption magnification (d) (g/g) |
|---|---|---|
| 36 | 1.22 | 0.015 |
| 37 | 1.20 | 0.013 |
| Comparative example 8 | 1.55 | 0.039 |
| 9 (Blank) | 1.63 | 0.042 |

As is clear from the results of examples 36 and 37 and comparative examples 8 and 9 shown in Table 10, as to the moldings in which the aqueous resin dispersion of the present invention was used as a water-resistant improver, the water absorption magnifications (c) and (d) became small. In other words, the aqueous resin dispersion has a more excellent water resistance function than a conventional aqueous resin.

[Example 38]

The aqueous resin dispersion (1) obtained in the example 1 was used as a paper strength additive which is a kind of a water-resistant improver.

First, the aqueous resin dispersion (1) was diluted with ion exchanged water so that concentration of a solid content in the aqueous resin dispersion (1) became 0.2 weight %, 0.4 weight % and 0.6 weight %, and three kinds of preparation solutions were obtained.

Next, quantitative filter paper (TOYO ROSHI Co., Ltd.; Product No. 5C) was immersed in the obtained preparation solutions, and the quantitative filter paper was squeezed by a mangle. Copolymers of 0.2 weight %, 0.4 weight % and 0.6 weight % in a solid content to the drying weight of the filter paper were incorporated with the filter paper.

The three kinds of the filter paper (hereinafter, referred to as treated paper) was heated at 110° C. for 3 or 12 minutes by a heated roll. Successively, the treated paper (total of 6 kinds) was cut in a width of 15 mm and a length of 210 mm so as to obtain test pieces. After the test pieces were immersed in ion exchanged water for 30 minutes, tensile strength (kgf) of the test pieces (hereinafter, referred to as tensile strength (d)) was measured according to JIS-P8135 and JIS-P8113.

In addition, ion exchanged water was poured into a breaker, and the treated paper was added thereto so that a ratio of the treated paper to the ion exchanged water became 0.3 weight %. Successively, after the treated paper was cracked, a discharge amount (ml) from a bypass was measured so that breakability was judged according to JIS-P8121 by using a Canadian standard water filter. The results are shown in Table 11.

Here, in the case where the breakability is excellent, since paper, namely, pulp was cracked finely, a discharge speed is lowered. Therefore, the discharge amount from the bypass becomes small. In other words, in the case where the discharge amount from the bypass is small, it is judged that the breakability is excellent.

[Example 39 Through 43]

The same process as in example 38 was carried out except that the aqueous resin dispersions (2) through (5) and (16) obtained in the examples 2 through 5 and 16 were used instead of the aqueous resin dispersion (1) so that respective corresponding treated paper (6 kinds for each, a total of 30 kinds) was obtained.

Then, tensile strength (d) of each obtained treated paper was measured and also a discharge amount from a bypass was measured so that breakability was judged. The results are shown in Table 11.

[Comparative Example 10]

The same process as in the example 38 was carried out except that polyamide-polyamine-epichlorohydrin resin (Japan PMC Corp.; WS-500) which is a conventional paper strength additive was used instead of the aqueous resin dispersion (1) so that treated paper for comparison (a total of 6 kinds) was obtained.

Tensile strength (d) of the obtained treated paper for comparison was measured and also a discharge amount from a bypass was measured so that breakability was judged. The results are shown in Table 11.

[Comparative Example 11]

The same process as in example 38 was carried out except that the aqueous resin dispersion for comparison obtained in comparative example 2 was used instead of the aqueous resin dispersion (1) so that treated paper for comparison (a total of 6 kinds) was obtained.

Tensile strength (d) of the obtained treated paper for comparison was measured. The results are shown in Table 11.

In addition, also as to treated paper in which the aqueous resin dispersion (1) was not used, namely, filter paper in which a copolymer was not incorporated, its tensile strength (d) was measured and also a discharge amount from a bypass was measured so that breakability was judged. The results are shown as Blank in Table 11.

TABLE 11

| Example | Heating time (min) | Pickup of copolymer (weight %) | Tensile strength (d) (kgf) | Discharge amount from bypass (ml) |
|---|---|---|---|---|
| 38 | 3 | 0.2 | 0.554 | 395 |
|  |  | 0.4 | 0.568 | 410 |
|  |  | 0.6 | 0.654 | 420 |
|  | 12 | 0.2 | 0.582 | 400 |
|  |  | 0.4 | 0.646 | 420 |
|  |  | 0.6 | 0.708 | 425 |
| 39 | 3 | 0.2 | 0.565 | 400 |
|  |  | 0.4 | 0.574 | 413 |
|  |  | 0.6 | 0.685 | 427 |
|  | 12 | 0.2 | 0.608 | 415 |
|  |  | 0.4 | 0.683 | 427 |
|  |  | 0.6 | 0.750 | 433 |
| 40 | 3 | 0.2 | 0.560 | 400 |
|  |  | 0.4 | 0.572 | 413 |
|  |  | 0.6 | 0.677 | 427 |
|  | 12 | 0.2 | 0.598 | 415 |
|  |  | 0.4 | 0.653 | 424 |
|  |  | 0.6 | 0.734 | 431 |
| 41 | 3 | 0.2 | 0.634 | 407 |
|  |  | 0.4 | 0.712 | 425 |
|  |  | 0.6 | 0.764 | 436 |
|  | 12 | 0.2 | 0.646 | 415 |
|  |  | 0.4 | 0.729 | 436 |
|  |  | 0.6 | 0.806 | 447 |
| 42 | 3 | 0.2 | 0.557 | 399 |
|  |  | 0.4 | 0.569 | 413 |
|  |  | 0.6 | 0.657 | 422 |
|  | 12 | 0.2 | 0.589 | 402 |
|  |  | 0.4 | 0.647 | 418 |
|  |  | 0.6 | 0.703 | 422 |
| 43 | 3 | 0.2 | 0.657 | 411 |
|  |  | 0.4 | 0.718 | 431 |
|  |  | 0.6 | 0.764 | 444 |
|  | 12 | 0.2 | 0.691 | 423 |
|  |  | 0.4 | 0.749 | 441 |
|  |  | 0.6 | 0.814 | 455 |
| Comparative example 10 | 3 | 0.2 | 0.580 | 465 |
|  |  | 0.4 | 0.595 | 473 |
|  |  | 0.6 | 0.643 | 480 |
|  | 12 | 0.2 | 0.633 | 485 |
|  |  | 0.4 | 0.702 | 503 |
|  |  | 0.6 | 0.785 | 515 |
| 11 | 3 | 0.2 | 0.493 | — |
|  |  | 0.4 | 0.516 | — |
|  |  | 0.6 | 0.527 | — |
|  | 12 | 0.2 | 0.496 | — |
|  |  | 0.4 | 0.520 | — |
|  |  | 0.6 | 0.532 | — |
| Blank |  |  | 0.462 | 367 |

As is clear from the results of the examples 38 through 43, comparative examples 10 and 11 and blank shown in Table 11, treated paper in which the aqueous resin dispersion of the present invention was used as a paper strength additive which is a kind of a water-resistant improver has excellent tensile strength (d), namely, wet strength. In other words, the water-resistant improver has paper strength function which is equal to that of polyamide polyamine epichlorohydrin resin which is a conventional paper strength additive. Furthermore, as to the treated paper in which the paper strength additive was used, a discharge amount from a bypass is small. This made it clear that breakability was excellent. Therefore, the water-resistant improver can apply wet strength and breakability to paper at the same time.

[Example 44]

The aqueous resin dispersion (1) obtained in example 1 was used as a paper strength additive which is a kind of a water-resistant improver.

First, the aqueous resin dispersion (1) was diluted with ion exchanged water so that concentration of a solid content in the aqueous resin dispersion (1) became 0.2 weight %, 0.4 weight % and 0.6 weight %. Next, paratoluenesulfonic acid as acid catalyst was added to these diluted solutions so that a ratio of the paratoluenesulfonic acid to a solid content of each aqueous resin dispersion (1) became 5 weight %, and three kinds of preparation solutions were obtained.

Next, quantitative filter paper (TOYO ROSHI Co., Ltd.; Product No. 5C) was immersed in the obtained preparation solutions, and the quantitative filter paper was squeezed by a mangle. Thereafter, 0.2 weight %, 0.4 weight % and 0.6 weight % of copolymers in a solid content to a drying weight of the filter paper were incorporated in the filter paper.

The three kinds of the filter paper (hereinafter, referred to as treated paper) was heated at 110° C. for 3 or 12 minutes by a heated roll. Successively, the treated paper (a total of 6 kinds) was cut in a width of 15 mm and a length of 210 mm so as to obtain test pieces. After the test pieces were immersed in ion exchanged water for 30 minutes, tensile strength (kgf) of the test pieces (hereinafter, referred to as tensile strength (e)) was measured according to JIS-P8135 and JIS-P8113. The results are shown in Table 12.

TABLE 12

| Example | Heating time (min) | Pickup of copolymer (weight %) | Tensile strength (e) (kgf) |
|---|---|---|---|
| 44 | 3 | 0.2 | 0.676 |
|  |  | 0.4 | 0.686 |
|  |  | 0.6 | 0.712 |
|  | 12 | 0.2 | 0.678 |
|  |  | 0.4 | 0.689 |
|  |  | 0.6 | 0.715 |

As is clear from the results of the example 44 shown in Table 12 and of the example 38 (Table 11) in which paratoluenesulfonic acid as acid catalyst was not added, in the case where the acid catalyst was added to the aqueous resin dispersion, wet strength was further improved. In other words, it is found that the aqueous resin dispersion of the present invention was effective when it was used together with the acid catalyst.

[Example 45]

The aqueous resin dispersion (1) obtained in the example 1 was used as an anti-fungus agent.

First, the aqueous resin dispersion (1) was diluted with ion exchanged water so that concentration of a solid content in the aqueous resin dispersion (1) became 1 weight %, and a preparation solution was obtained. Next, quantitative filter paper (TOYO ROSHI Co., Ltd.; Product No. 5C) was immersed in the obtained preparation solution, and the quantitative filter paper was squeezed by a mangle. A copolymer of 1 weight % in a solid content to a drying weight of the filter paper was immersed in the filter paper. The filter paper was heated at 110° C. for 12 minutes by using the heated roll so that treated paper was obtained.

Meanwhile, *Escherichia coli* (IFO 3301) was shaking-cultivated at 37° C. for 12 hours by means of nutrient broth containing 0.2% beef extract (Eiken Chemical Co., Ltd.). Then, a preparation was made so that a number of bacteria per 1 ml in the culture medium became from $1.5 \times 10^8$ to $3.0 \times 10^8$. Next, the bacteria solution was diluted to 1000 times with sterilizing phosphoric buffer solution so as to obtain a test bacteria solution.

Thereafter, 70 ml of a sterilizing phosphoric buffer solution and 5 ml of the test bacteria solution were poured into a conical flask, and successively 0.75 g of the treated paper was added thereto so as to obtain a test solution. The test solution was shaking-cultivated at 25° C. for 1 hour. After the shaking culture, the number of live bacteria in the test solution was measured by pour plating method method.

Furthermore, a reduced coefficient (%) of the *Escherichia coli* was calculated from a number of the live bacteria of the *Escherichia coli* before and after the culture. The results are shown in Table 13 together with a blank.

[Example 46]

The same process as in the example 45 was carried out except that the aqueous resin dispersion (3) was used instead of the aqueous resin dispersion (1) so as to obtain treated paper. A test solution was prepared by using the obtained treated paper so that *Escherichia coli* was cultivated in a same manner as in example 45.

After the culture, a number of live bacteria was measured by pour plating method method. Moreover, a reduced coefficient (%) of the *Escherichia coli* was calculated. The results are shown in Table 13.

TABLE 13

|  |  | A number of live bacteria | Reduce coefficient (%) |
|---|---|---|---|
| Example 45 | | $2.0 \times 10^3$ | 88.9 |
| 46 | | $2.8 \times 10^3$ | 84.4 |
| Blank | Before culture | $1.8 \times 10^4$ | — |
| | After culture | $1.6 \times 10^4$ | 11.1 |

[Example 47]

The aqueous resin dispersion (1) obtained in the example 1 was used as an anti-fungus agent.

First, the aqueous resin dispersion (1) was diluted with sterilizing refined water so as to obtain a prepared solution. Next, a sensitivity measuring culture medium (NISSUI PHARMACEUTICAL CO., LTD.; dextrose peptone broth containing 1.5% agar) was dissolved, the prepared solution was added to the culture medium whose temperature was kept at 50° C. and it was sufficiently mixed. Thereafter, the mixed solution was divisionally poured into laboratory dishes and was set so as to obtain a sensitivity measuring plate.

Meanwhile, *Chaetomium globosum* and *Myrothecium verrucaria* were cultivated at 25° C. by means of a bacteria increase culture medium (Eiken Chemical Co., Ltd.; potato dextrose agar). After the culture, sufficiently formed spores were floated in a sterilized sulfosuccinic acid dioctyl sodium solvent and a preparation was made so that a number of the spores became $10^6$/ml. Then, an inoculation bacteria solution was obtained.

The inoculation bacteria solution for a 2 cm line was applied to the sensitivity measuring plate by means of a nichrome wire loop and cultivated at 25° C. for 7 days. After that, a lowest concentration which prevents bacteria from growing, namely, concentration of a solid content in the aqueous resin dispersion (1) in the sensitivity measuring culture medium was used as a Minimum Inhibition Concentration (%). The results are shown in Table 14.

[Example 48]

The same process as in the example 47 was carried out except that the aqueous resin dispersion (3) was used instead of the aqueous resin dispersion (1) so as to obtain a sensitivity measuring plate. An inoculation bacteria solution was cultivated in the same manner as in the example 47 by using the obtained sensitivity measuring plate.

After the culture, the lowest concentration which inhibit the bacteria growing was used as Minimum Inhibition Concentration (%). The results are shown in Table 14.

TABLE 14

| Example | Sort of bacteria | Minimum Inhibition Concentration (%) |
|---|---|---|
| 47 | Chaetomium | 2.5 |
| | Myrothecium | 2.5 |
| 48 | Chaetomium | 5.0 |
| | Myrothecium | 5.0 |

[Example 49]

The aqueous resin dispersion (1) obtained in the example 1 was used as an anti-fungus agent.

First, 190 ml of physiologic saline was poured into a flask of 300 ml and sterilized at 120° C. for 20 minutes. Next, a suspension of *Staphylococcus aureus* prepared in a test tube was added to the physiologic saline and it was left in a thermostatic chamber of 20° C. for 1 hour.

Thereafter, the aqueous resin dispersion (1) was added to the flask so that a ratio became 100 ppm in a solid content and was cultivated at 28°±2° C. for 48 hours. Then, during the culture, the culture solution was dispensed 100 μl every time when a predetermined time passed. After the dispensed culture solution was diluted 100 times with sterilized physiologic saline, a number of bacteria was separated by a spiral plater so that a number of live bacteria (CFU/ml) was measured (CFU: Colony Forming Unit). Further, a bactericidal coefficient (%) was calculated. The results are shown in Table 15.

[Comparative Example 12]

The same process as in the example 49 was carried out except that glutaraldehyde which is a conventional anti-fungus agent was used instead of the aqueous resin dispersion (1) so that Staphylococcus aureus was cultivated. A number of live bacteria (CFU/ml) was measured in the like manner of in the example 49. Moreover, bactericidal coefficient (%) was calculated. The results are shown in Table 15 together with blank.

TABLE 15

| | Culture time | A number of live bacteria (CFU/ml) | Bactericidal coefficient (%) |
|---|---|---|---|
| Example 49 | Before culture | $6.8 \times 10^4$ | — |
| | 1 hour later | $1.3 \times 10^4$ | 81 |
| | 2 hours later | $6.5 \times 10^4$ | 90 |
| | 3 hours later | $5.9 \times 10^4$ | 100 |
| | 24 hours later | $8.1 \times 10^3$ | 100 |
| Comparative Example 12 | Before culture | $1.8 \times 10$- | — |
| | 1 hour later | $1.0 \times 10$- | 44 |
| | 2 hours later | $9.6 \times 10^4$ | 95 |
| | 3 hours later | $2.0 \times 10^4$ | 100 |
| | 24 hours later | $6.1 \times 10^3$ | 100 |
| Blank | Before culture | $7.6 \times 10^3$ | — |
| | 1 hour later | $1.2 \times 10$- | — |
| | 2 hours later | $9.5 \times 10^4$ | — |
| | 3 hours later | $1.0 \times 10$- | — |
| | 24 hours later | $6.4 \times 10^4$ | — |

As is clear from the results of the examples 45 through 49 and the comparative example 12 and the blank shown in Tables 13 through 15, excellent antifungal properties which are equivalent to glutaraldehyde as a conventional anti-fungus agent can be provided to various products and compositions by using the aqueous resin dispersion of the present invention as an anti-fungus agent. In other words, it was found that the anti-fungus agent has excellent antifungal properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aqueous resin dispersion obtained by a process comprising dissolving (meth) acrolein and a vinyl monomer in an organic solvent, copolymerizing said vinyl monomer and said (meth) acrolein to obtain a copolymer solution, dispersing the obtained copolymer solution in an aqueous medium and removing an unreacted (meth) acrolein, wherein a content of the unreacted (meth) acrolein in the dispersion is 0.1 weight percent or below based on a solid content of said aqueous resin dispersion and wherein the content of the (meth) acrolein in said copolymer based on a total amount of (meth) acrolein and a vinyl monomer is in the range of from 10 weight % to 80 weight %.

2. The aqueous resin dispersion as defined in claim 1, wherein a content of the unreacted (meth) acrolein in the dispersion is 0.05 weight % or below based on a solid content of said aqueous resin dispersion.

3. The aqueous resin dispersion as defined in claim 1, wherein a content of the unreacted (meth) acrolein in the dispersion is 0.01 weight % or below based on a solid content of said aqueous resin dispersion.

4. The aqueous resin dispersion as defined in claim 1, wherein a content in the dispersion of an oligomer whose number-average molecular weight is less than 1000 is 10 weight % or below based on a solid content of said aqueous resin dispersion.

5. The aqueous resin dispersion as defined in claim 1, wherein a content in the dispersion of an oligomer whose number-average molecular weight is less than 1000 is 5 weight % or below based on a solid content of said aqueous resin dispersion.

6. The aqueous resin dispersion as defined in claim 1, wherein a content in the dispersion of an oligomer whose number-average molecular weight is less than 1000 is 2 weight % or below based on a solid content of said aqueous resin dispersion.

7. The aqueous resin dispersion as defined in claim 1, wherein a molecular weight of the copolymer in the dispersion is in the range from 3000 to 500000 in a number-average molecular weight.

8. The aqueous dispersion of claim 1, wherein the step of removing the unreacted (meth) acrolein is performed by heating said copolymer solution or by heating said aqueous resin dispersion so as to evaporate the unreacted (meth) acrolein.

9. The aqueous resin dispersion as defined in claim 8, wherein the step of removing the unreacted (meth) acrolein is performed under pressures of 50 mmHg to 600 mmHg.

10. The aqueous resin dispersion as defined in claim 9, wherein the step of removing the unreacted (meth) acrolein is performed by heating said copolymer solution to not less than 100° C.

11. The aqueous resin dispersion as defined in claim 9, wherein the step of removing the unreacted (meth) acrolein is performed by heating said aqueous resin dispersion to 50° C. to 100° C.

* * * * *